(12) United States Patent
Wakazono et al.

(10) Patent No.: US 8,488,253 B2
(45) Date of Patent: Jul. 16, 2013

(54) ZOOM LENS AND IMAGE PICKUP APPARATUS INCLUDING THE SAME

(75) Inventors: Tsuyoshi Wakazono, Utsunomiya (JP); Fumiaki Usui, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/428,200

(22) Filed: Mar. 23, 2012

(65) Prior Publication Data
US 2012/0250162 A1 Oct. 4, 2012

(30) Foreign Application Priority Data
Mar. 28, 2011 (JP) .................... 2011-069565

(51) Int. Cl.
*G02B 15/14* (2006.01)

(52) U.S. Cl.
USPC ............... 359/686; 359/683; 359/684

(58) Field of Classification Search
USPC ................... 359/676, 683, 684, 686
See application file for complete search history.

(56) References Cited

U.S. PATENT DOCUMENTS

| 5,610,769 | A | 3/1997 | Shoji |
| 5,745,300 | A * | 4/1998 | Usui et al. ............ 359/684 |
| 5,808,809 | A | 9/1998 | Yahagi |
| 6,141,157 | A | 10/2000 | Nurishi et al. |
| 6,512,637 | B1 * | 1/2003 | Tomita ................. 359/686 |
| 6,825,990 | B2 | 11/2004 | Yoshimi et al. |
| 6,961,188 | B2 | 11/2005 | Betensky et al. |
| 2003/0133200 | A1 | 7/2003 | Sato |
| 2004/0070844 | A1 | 4/2004 | Sato |
| 2007/0188888 | A1 | 8/2007 | Saori |
| 2011/0037878 | A1 | 2/2011 | Wakazono et al. |
| 2011/0037880 | A1 | 2/2011 | Sakamoto |
| 2011/0038056 | A1 | 2/2011 | Nakamura |

FOREIGN PATENT DOCUMENTS

| JP | 7151966 A | 6/1995 |
| JP | 9258102 A | 10/1997 |
| JP | 2004-085846 A | 3/2004 |
| JP | 2004-309761 A | 11/2004 |

OTHER PUBLICATIONS

Extended European Search Report issued Jun. 29, 2012 for corresponding EP12002247.

(Continued)

*Primary Examiner* — Scott J Sugarman
(74) *Attorney, Agent, or Firm* — Rossi, Kimms & McDowell LLP

(57) ABSTRACT

A zoom lens includes, in order from object side: a positive first lens unit which does not move for zooming; a zoom lens unit including at least two lens units which move for zooming; a stop; and a positive imaging lens unit which does not move for zooming, in which: the first lens unit includes, in order from object side, a positive first sub-lens unit, a negative second sub-lens unit, and a positive third sub-lens unit; the third sub-lens unit includes a movable positive sub-third sub-lens unit; the second sub-lens unit and sub-third sub-lens unit are driven to object side for focusing to a close object; and focal length f12 of the second sub-lens unit, focal length f13f of the sub-third sub-lens unit, drive amount δ×12 of the second sub-lens unit in focusing, and drive amount δ×13f of the sub-third sub-lens unit in focusing satisfy $-2.5 < f12/f13f < -0.4$ and $0.05 < \delta \times 13f/\delta \times 12 < 5.0$.

5 Claims, 18 Drawing Sheets

OTHER PUBLICATIONS

Extended European Search Report issued Nov. 19, 2010 for EP 10172365.8; cited in related U.S. Appl. No. 12/848,329.

Smith, Warren, "Modern Lens Design: A Resource Manual", McGraw Hill, 1992; XP002603812, pp. 72-75; cited in related U.S. Appl. No. 12/848,329.

Shannon, Robert, "The Art and Science of Optical Design", Cambridge University Press, 1997; XP002603813, pp. 178-191; cited in related U.S. Appl. No. 12/848,329.

Schott, AG "Optischer Glaskatolog-Datenblatter"; Oct. 2010, Shott, Mainz, XP002603814, pp. 4, 54, 119. cited in related U.S. Appl. No. 12/848,329.

Wakazono, Tsuyoshi, "Zoom Lens and Image Pickup Apparatus Including the Same", Co-pending U.S. Appl. No. 13/430,784; Application and Drawings provided.

Extended European Search Report issued Aug. 13, 2012 for corresponding EP12001930.2.

* cited by examiner

ZOOM LENS AND IMAGE PICKUP APPARATUS INCLUDING THE SAME

BACKGROUND OF THE INVENTION

1. Field of the Invention

The present invention relates to a zoom lens suitable for a television camera, a motion-picture camera, a video camera, a photography camera, and a digital camera, and more particularly, to a zoom lens having a high magnification, a small size and light weight, and little aberration deviation due to focus adjustment, and to an image pickup apparatus including the zoom lens.

2. Description of the Related Art

Conventionally, as for a zoom lens in which focus adjustment is performed by a lens unit disposed closer to an object side with respect to a magnification-varying lens unit, there are proposed various types of so-called floating focus systems in which multiple lens units move for focusing.

For instance, Japanese Patent Application Laid-Open No. H07-151966 discloses a zoom lens in which a first lens unit includes a first sub-lens unit having negative refractive power, a second sub-lens unit having positive refractive power, and a third sub-lens unit having positive refractive power, and both the second sub-lens unit and the third sub-lens unit move to the object side when the focus adjustment is performed from an object at infinity to an object at a short distance.

Further, Japanese Patent Application Laid-Open No. H09-258102 discloses a zoom lens in which a first lens unit includes a first sub-lens unit having negative refractive power, a second sub-lens unit having positive refractive power, and a third sub-lens unit having positive refractive power, and the second sub-lens unit moves to an image side and the third sub-lens unit moves to the object side when the focus adjustment is performed from an object at infinity to an object at a short distance.

The zoom lens used for a television camera, a motion-picture camera, or the like is desired to achieve a higher magnification as well as a small size and light weight in order to secure mobility and to improve flexibility of photography. In addition, the zoom lens is required to have high performance with little aberration deviation due to focus adjustment. Further, a lens used for motion-picture filming or commercial filming is desired to suppress a size variation of a subject due to focus adjustment (hereinafter, referred to as breathing).

It is difficult to suppress the breathing by the focus adjustment method described in Japanese Patent Application Laid-Open No. H07-151966.

A focus adjustment method described in Japanese Patent Application Laid-Open No. H09-258102 is suitable for a wide-angle zoom lens, but it is difficult to achieve a small size and light weight as well as a high magnification.

SUMMARY OF THE INVENTION

Therefore, an object of the present invention is to provide a zoom lens having little aberration deviation due to focus adjustment and a focus adjustment method with less breathing, and to provide an image pickup apparatus including the zoom lens.

In order to attain the above-mentioned object, exemplary embodiments of the present invention provide a zoom lens and an image pickup apparatus, the zoom lens including, in order from an object side: a first lens unit having positive refractive power which does not move for varying magnification; a magnification-varying lens unit including at least two lens units which move for varying magnification; an aperture stop; and an imaging lens unit having positive refractive power which does not move for varying magnification, in which: the first lens unit includes, in order from the object side, a first sub-lens unit having positive refractive power, a second sub-lens unit having negative refractive power, and a third sub-lens unit having positive refractive power; the third sub-lens unit includes a movable sub-third sub-lens unit having positive refractive power; the second sub-lens unit and the sub-third sub-lens unit are respectively driven to the object side so as to perform focus adjustment to an object at a short distance; and the following expressions are satisfied:

$$-2.5 < f12/f13f < -0.4; \text{ and}$$

$$0.05 < \delta \times 13f / \delta \times 12 < 5.0,$$

where f12 represents a focal length of the second sub-lens unit, f13f represents a focal length of the sub-third sub-lens unit, $\delta \times 12$ represents a drive amount of the second sub-lens unit in focus adjustment, and $\delta \times 13f$ represents a drive amount of the sub-third sub-lens unit in focus adjustment.

According to the exemplary embodiments of the present invention, there may be provided a zoom lens having little aberration deviation due to focus adjustment and a focus adjustment method with less breathing, and an image pickup apparatus including the zoom lens.

Further features of the present invention will become apparent from the following description of exemplary embodiments with reference to the attached drawings.

BRIEF DESCRIPTION OF THE DRAWINGS

FIG. 4Ab is an aberration diagram at the wide-angle end when focusing at infinity according to Embodiment 1 of the present invention.

FIG. 4Ac is an aberration diagram at the wide-angle end when focusing at close range (1.5 m) according to Embodiment 1 of the present invention.

FIG. 4Bb is an aberration diagram at the telephoto end when focusing at infinity according to Embodiment 1 of the present invention.

FIG. 4Bc is an aberration diagram at the telephoto end when focusing at close range (1.5 m) according to Embodiment 1 of the present invention.

FIG. 6Ab is an aberration diagram at the wide-angle end when focusing at infinity according to Embodiment 2 of the present invention.

FIG. 6Ac is an aberration diagram at the wide-angle end when focusing at close range (1.8 m) according to Embodiment 2 of the present invention.

FIG. 6Bb is an aberration diagram at the telephoto end when focusing at infinity according to Embodiment 2 of the present invention.

FIG. 6Bc is an aberration diagram at the telephoto end when focusing at close range (1.8 m) according to Embodiment 2 of the present invention.

FIG. 8Ab is an aberration diagram at the wide-angle end when focusing at infinity according to Embodiment 3 of the present invention.

FIG. 8Ac is an aberration diagram at the wide-angle end when focusing at close range (1.8 m) according to Embodiment 3 of the present invention.

FIG. 8Bb is an aberration diagram at the telephoto end when focusing at infinity according to Embodiment 3 of the present invention.

FIG. 8Bc is an aberration diagram at the telephoto end when focusing at close range (1.8 m) according to Embodiment 3 of the present invention.

FIG. 10Ab is an aberration diagram at the wide-angle end when focusing at infinity according to Embodiment 4 of the present invention.

FIG. 10Ac is an aberration diagram at the wide-angle end when focusing at close range (3.5 m) according to Embodiment 4 of the present invention.

FIG. 10Bb is an aberration diagram at the telephoto end when focusing at infinity according to Embodiment 4 of the present invention.

FIG. 10Bc is an aberration diagram at the telephoto end when focusing at close range (3.5 m) according to Embodiment 4 of the present invention.

FIG. 12Ab is an aberration diagram at the wide-angle end when focusing at infinity according to Embodiment 5 of the present invention.

FIG. 12Ac is an aberration diagram at the wide-angle end when focusing at close range (1.8 m) according to Embodiment 5 of the present invention.

FIG. 12Bb is an aberration diagram at the telephoto end when focusing at infinity according to Embodiment 5 of the present invention.

FIG. 12Bc is an aberration diagram at the telephoto end when focusing at close range (1.8 m) according to Embodiment 5 of the present invention.

DESCRIPTION OF THE EMBODIMENTS

Hereinafter, embodiments of the present invention are described in detail with reference to the attached drawings.

First, features of a zoom lens according to the present invention are described with reference to expressions.

The structure of a first lens unit and a focus adjustment method for achieving a zoom lens of the present invention, which has a high magnification, a small size and light weight, little aberration deviation due to focus adjustment, and further little breathing, are defined below. The aberration deviation due to focus adjustment means mainly a variation of field curvature from an object distance of infinity to a close range.

The zoom lens according to the present invention includes, in order from an object side, a first lens unit having positive refractive power which does not move for varying magnification, a magnification-varying lens unit including at least two lens units which move for varying magnification, an aperture stop, and an imaging lens unit having positive refractive power which does not move for varying magnification. The first lens unit includes, in order from the object side, a first sub-lens unit having positive refractive power, a second sub-lens unit having negative refractive power, and a third sub-lens unit having positive refractive power. The third sub-lens unit includes a movable sub-third sub-lens unit having positive refractive power. The second sub-lens unit and the sub-third sub-lens unit are driven to the object side, to thereby perform the focus adjustment to an object at a short distance. In other words, the second sub-lens unit and the sub-third sub-lens unit move for the focus adjustment, but the first sub-lens unit does not move for the focus adjustment.

Further, the zoom lens satisfies the following expressions:

$$-2.5 < f12/f13f < -0.4 \quad (1)$$

$$0.05 < \delta x 13f/\delta x 12 < 5.0 \quad (2)$$

where f12 represents a focal length of the second sub-lens unit, f13f represents a focal length of the sub-third sub-lens unit, δ×12 represents a drive amount of the second sub-lens unit to the object side in the focus adjustment, and δ×13f represents a drive amount of the sub-third sub-lens unit to the object side in the focus adjustment.

An optical action of the present invention is described with reference to FIG. 1.

Figure 1:
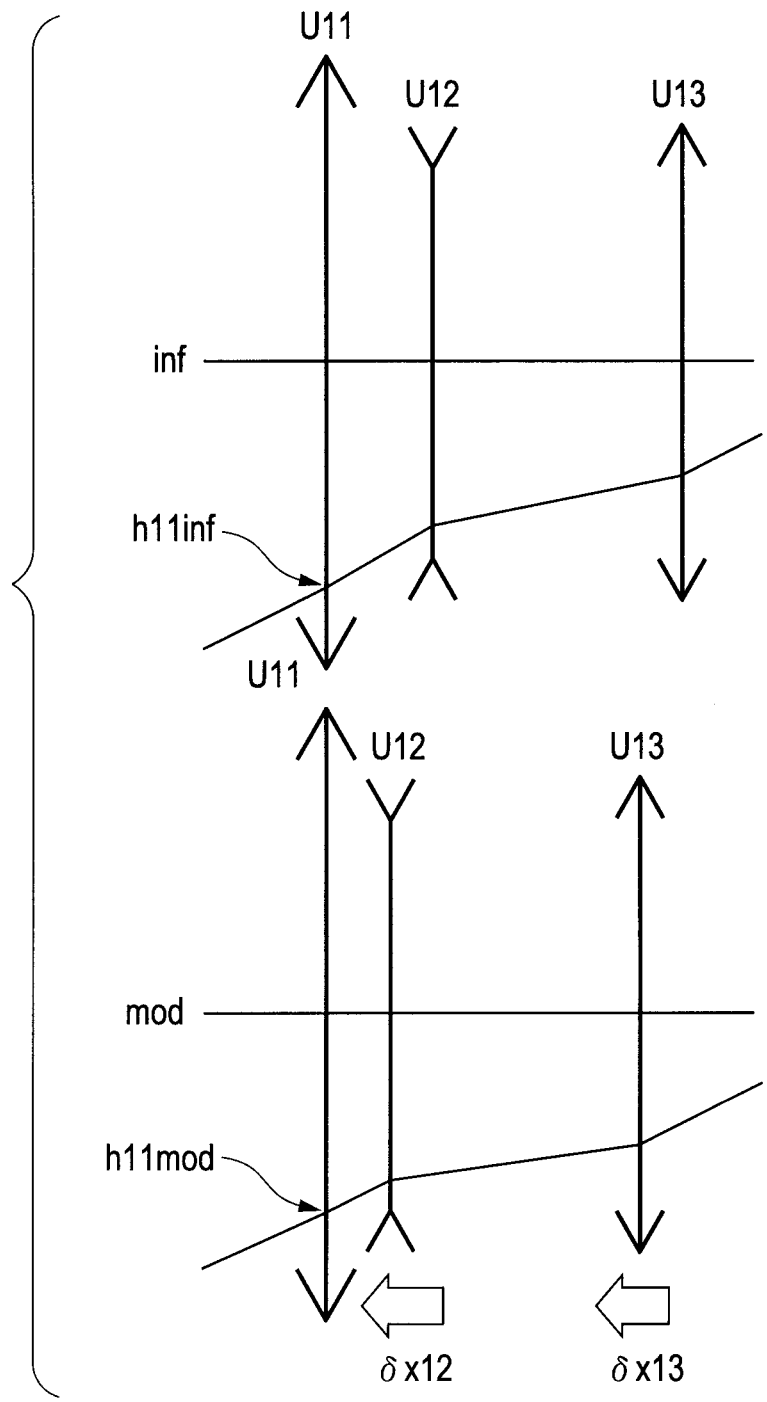
FIG. 1 is a diagram illustrating a principle of the present invention.

FIG. 1 is a conceptual diagram of an off-axis optical path of the first lens at an arbitrary zoom position at an object distance of infinity (A) and a minimum object distance (B). In FIG. 1, the left side is the object side, and the right side is an image plane side. FIG. 1 illustrates, in order from the object side, a first sub-lens unit U11 having positive refractive power, a second sub-lens unit U12 having negative refractive power, and a third sub-lens unit U13 having positive refractive power. The zoom lens satisfies the following relationship:

$$h11inf > h11 \bmod \quad (6)$$

where h11inf represents a height of an off-axis light beam of the first sub-lens unit U11 at the object distance of infinity, and h11 mod represents a height of the off-axis light beam of the first sub-lens unit U11 at close range.

In other words, the height of the off-axis incident light beam passing through the first sub-lens unit U11 is lower at the object distance of close range than at the object distance of infinity. According to this effect, when the object distance varies from infinity to close range, the field curvature varies to the over side. In addition, when the second sub-lens unit U12 is driven to the object side so that the object distance varies from infinity to close range, the field curvature varies to the under side on the close range side. Further, when the third sub-lens unit U13 is driven to the object side so that the object distance varies from infinity to close range, the field curvature varies to the over side on the close range side. Thus, an extent of contribution of the first sub-lens unit U11 shifting the field curvature to the over side due to the variation of the incident light beam height, an extent of contribution of the second sub-lens unit U12 shifting the field curvature to the under side by being driven to the object side, and an extent of contribution of the third sub-lens unit U13 shifting the field curvature to the over side by being driven to the object side are all canceled by one another. Hence, a variation of the field curvature due to focus adjustment can be suppressed.

Note that, a drive amount of the second sub-lens unit U12 is increased due to an increase of power of the first sub-lens unit U11, and hence it is necessary to appropriately set the power of the first sub-lens unit U11.

Next, description is given of suppression of breathing by a so-called floating focus system in which the two lens unit including the second sub-lens unit U12 and the third sub-lens unit U13 are moved. When the second sub-lens unit U12 is driven to the object side so that the object distance varies from infinity to close range, a focal length of the entire system is shifted to the wide-angle side. On the other hand, when the third sub-lens unit U13 is driven to the object side so that the object distance varies from infinity to close range, the focal length of the entire system is shifted to the telephoto side.

Thus, the breathing can be canceled by appropriately setting a ratio of drive amount between the second sub-lens unit U12 and the third sub-lens unit U13.

Next, the above-mentioned expressions (1) and (2) are described.

The expression (1) defines a ratio between the focal length f12 of the second sub-lens unit U12 and the focal length f13f of the movable sub-third sub-lens unit having positive refractive power included in the third sub-lens unit U13.

$$-2.5 < f12/f13f < -0.4 \quad (1)$$

When the expression (1) is satisfied, aberration deviation due to focus adjustment can be suppressed. When the upper limit of the expression (1) is not satisfied, the positive refractive power of the sub-third sub-lens unit becomes too large with respect to the negative refractive power of the second sub-lens unit U12. Therefore, when the second sub-lens unit U12 and the sub-third sub-lens unit are driven to the object side so that the object distance varies from infinity to close range, the variation of the field curvature on the close range side of the object distance is corrected excessively to the over side. On the other hand, when the lower limit of the expression (1) is not satisfied, the positive refractive power of the sub-third sub-lens unit becomes too small with respect to the negative refractive power of the second sub-lens unit U12. Therefore, when the second sub-lens unit U12 and the sub-third sub-lens unit are driven to the object side so that the object distance varies from infinity to close range, the variation of the field curvature on the close range side of the object distance is corrected excessively to the under side. Further, it is more preferred to set the expression as follows.

$$-1.8 < f12/f13f < -0.6 \quad (1a)$$

The following expression (2) defines a ratio between a drive amount of the second sub-lens unit U12 in focus adjustment and a drive amount of the third sub-lens unit U13 or the lens unit having positive refractive power in the third sub-lens unit U13.

$$0.05 < \delta \times 13f/\delta \times 12 < 5.0 \quad (2)$$

When the expression (2) is satisfied, it is possible to achieve both the suppression of aberration deviation due to focus adjustment and the suppression of breathing. When the upper limit of the expression (2) is not satisfied, the drive amount of the sub-third sub-lens unit in focus adjustment becomes too large with respect to the drive amount of the second sub-lens unit U12 in focus adjustment. Therefore, the variation of the field curvature on the close range side of the object distance is corrected excessively to the over side. In addition, the focal length on the close range side of the object distance becomes long, and hence it becomes difficult to suppress the breathing.

When the lower limit of the expression (2) is not satisfied, the drive amount of the sub-third sub-lens unit in the focus adjustment becomes too small with respect to the drive amount of the second sub-lens unit U12 in the focus adjustment. Therefore, the variation of the field curvature on the close range side of the object distance becomes excessively short to the under side. In addition, the focal length on the close range side of the object distance becomes short, and hence it becomes difficult to suppress the breathing. Further, it is more preferred to set the expression as follows.

$$0.13 < \delta \times 13f/\delta \times 12 < 2.2 \quad (2a)$$

The following expression (3) defines a ratio between the focal length f1 of the first lens unit U1 and the focal length f11 of the first sub-lens unit U11.

$$0.07 < f1/f11 < 0.35 \quad (3)$$

When the expression (3) is satisfied, the aberration deviation due to focus adjustment can be suppressed. When the upper limit of the expression (3) is not satisfied, the power of the first sub-lens unit U11 becomes too strong with respect to the first lens unit U1, and hence the drive amount of the second sub-lens unit U12 is increased. Thus, it becomes difficult to suppress the aberration deviation due to focus adjustment and to realize a small size and light weight. When the lower limit of the expression (3) is not satisfied, the power of the first sub-lens unit U11 with respect to the first lens unit U1 becomes too weak, and hence the suppressing effect of field curvature variation of the first sub-lens unit U11 in focus adjustment is eliminated. Further, it is more preferred to set the expression as follows.

$$0.11 < f1/f11 < 0.28 \quad (3a)$$

The following expression (4) defines a ratio between the focal length f1 of the first lens unit and the focal length ft of the entire system of the zoom lens at the telephoto end.

$$0.2 < f1/ft < 1.0 \quad (4)$$

When the expression (4) is satisfied, it is possible to achieve both a high magnification and suppression of the aberration deviation due to focus adjustment. When the upper limit of the expression (4) is not satisfied, the focal length of the first lens unit U1 with respect to the focal length at the telephoto end in the entire system of the zoom lens becomes too long. An object point position of the magnification-varying lens unit becomes far when the focal length of the first lens unit U1 becomes long, and hence a move amount for varying magnification is increased, with the result that it becomes difficult to realize high magnification. When the lower limit of the expression (4) is not satisfied, the power of the first lens unit U1 with respect to the focal length at the telephoto end in the entire system of the zoom lens becomes too strong, and hence it becomes difficult to suppress various aberrations due to the first lens unit U1. Further, it is more preferred to set the expression as follows.

$$0.35 < f1/ft < 0.7 \quad (4a)$$

Further, in an image pickup apparatus including the zoom lens having the features described above and a solid-state image pickup element that receives light of an image formed by the zoom lens and has a predetermined effective image pickup range, the present invention defines the following expression for using the zoom lens effectively in particular.

$$0.7 < fw/IS < 2.4 \quad (5)$$

where fw represents a focal length of an entire system of the zoom lens at the wide-angle end, and IS represents an image size.

When the expression (5) is satisfied, it is possible to achieve a small size and light weight as well as suppression of the aberration deviation due to focus adjustment. When the upper limit of the expression (5) is not satisfied, the focal length of the entire system of the zoom lens at the wide-angle end becomes too long. When the lower limit of the expression (5) is not satisfied, the focal length fw of the entire system of the zoom lens at the wide-angle end becomes too short. Therefore, an incident height of an off-axis light beam of the first sub-lens unit U11 is increased so that a lens outer diameter is increased.

Further, it is more preferred to set the expression as follows.

$$0.85 < fw/IS < 1.20 \quad (5a)$$

Note that, it is preferred that such a magnification-varying ratio of the zoom lens that the zoom lens of the present invention is used effectively in particular be four or larger.

A zoom lens and an image pickup apparatus including the zoom lens according to embodiments of the present invention are described below.

Embodiment 1

Figure 2A:
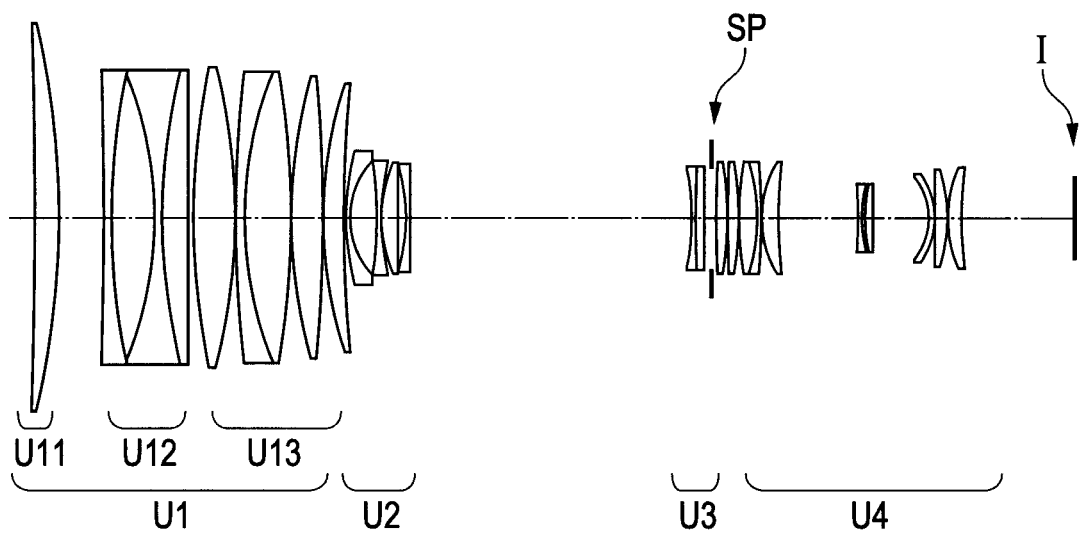
FIG. 2A is a lens cross sectional view at a wide-angle end when focusing at infinity according to Embodiment 1 of the present invention.
Figure 2B:
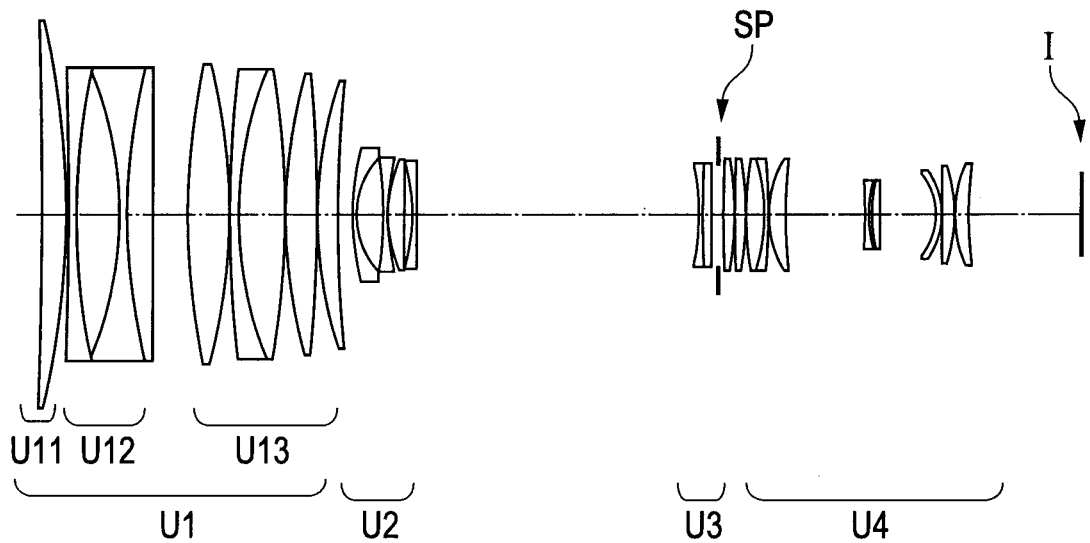
FIG. 2B is a lens cross sectional view at the wide-angle end when focusing at close range according to Embodiment 1 of the present invention.

FIGS. 2A and 2B are lens cross sectional views of a zoom lens according to Embodiment 1 (Numerical Embodiment 1) of the present invention at a wide-angle end in which the object distance is infinity and close range, respectively.

In FIGS. 2A and 2B, the zoom lens of this embodiment includes, in order from the object side (left side), a focus lens unit having positive refractive power as the first lens unit U1, a variator having negative refractive power for varying magnification as a second lens unit U2, a compensator having negative refractive power as a third lens unit U3, a stop SP, an imaging lens unit having positive refractive power and an image forming action as a fourth lens unit U4, and an image pickup surface I. In this embodiment, the second lens unit U2 and the third lens unit U3 constitute the magnification-varying lens unit. The second lens unit U2 (variator) varies magnification from the wide-angle end to the telephoto end by moving monotonously on the optical axis toward the image plane side. The third lens unit U3 (compensator) moves non-linearly on the optical axis in order to correct image plane variation accompanying the magnification variation.

A structure of the first lens unit U1 in this embodiment corresponds to first to seventeenth surfaces. The first lens unit U1 includes the first sub-lens unit U11 having positive refractive power, the second sub-lens unit U12 having negative refractive power that moves 16.16 mm toward the object side from the object distance of infinity to close range, and the third sub-lens unit U13 having positive refractive power that moves 4.85 mm toward the object side from the object distance of infinity to close range. In this embodiment, the entire third sub-lens unit U13 corresponds to the sub-third sub-lens unit U13f.

Figure 3A:
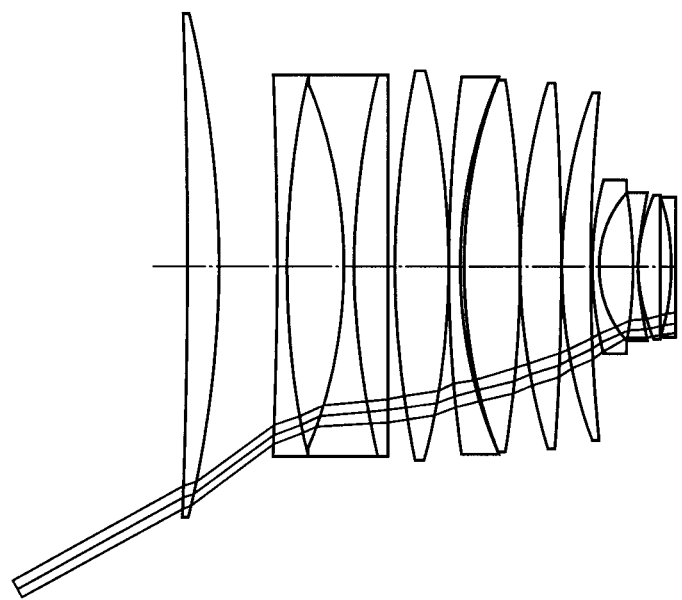
FIG. 3A is an optical path diagram at a telephoto end when focusing at infinity according to Embodiment 1 of the present invention.
Figure 3B:
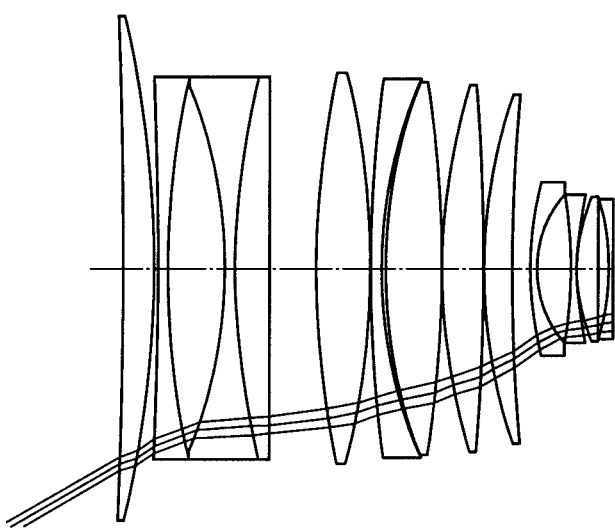
FIG. 3B is an optical path diagram at a telephoto end when focusing at close range according to Embodiment 1 of the present invention.

FIGS. 3A and 3B respectively are optical path diagrams of the first lens unit U1 of Embodiment 1 of the present invention. In the first sub-lens unit U11, it is understood that the height of the off-axis incident light beam at the object distance of infinity (FIG. 3A) is larger than the height of the off-axis incident light beam at the object distance of close range (FIG. 3B).

Figure 4A:
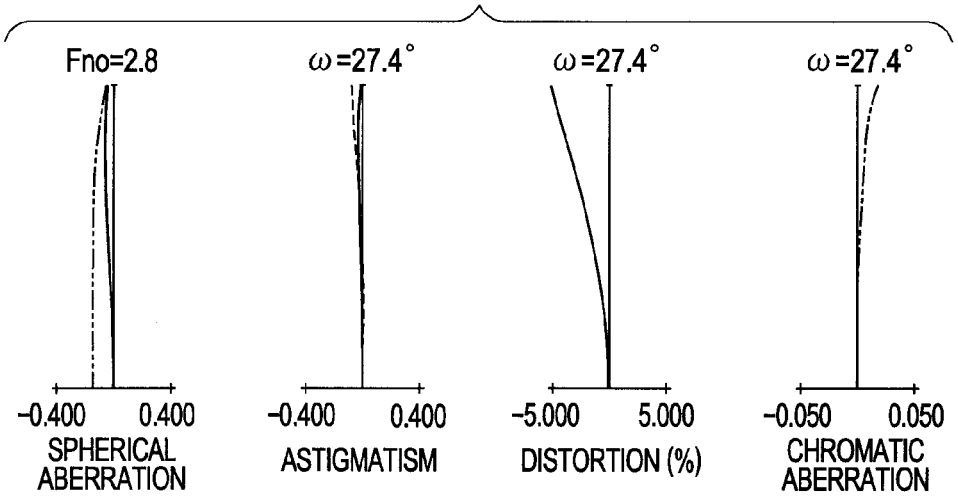
FIG. 4Aa is an aberration diagram at the wide-angle end when focusing at an object distance of 7.0 m according to Embodiment 1 of the present invention.
Figure 4A:
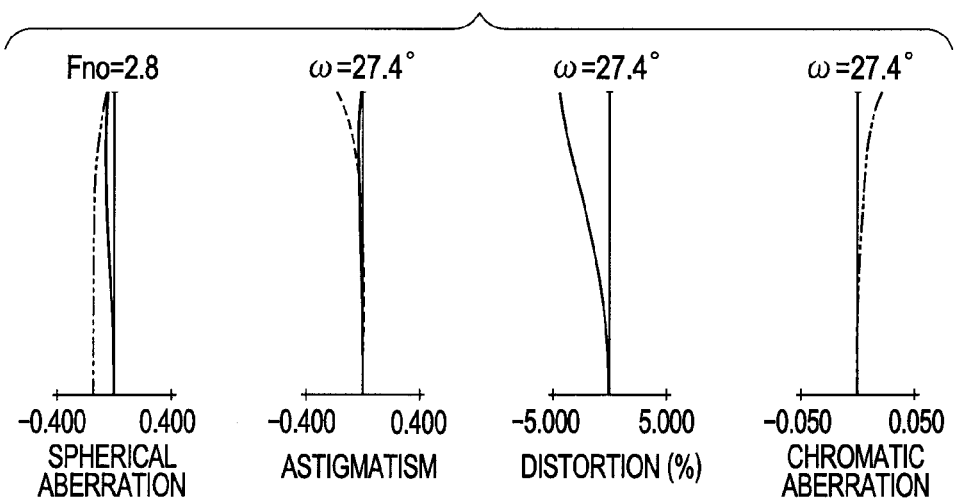
Figure 4A:
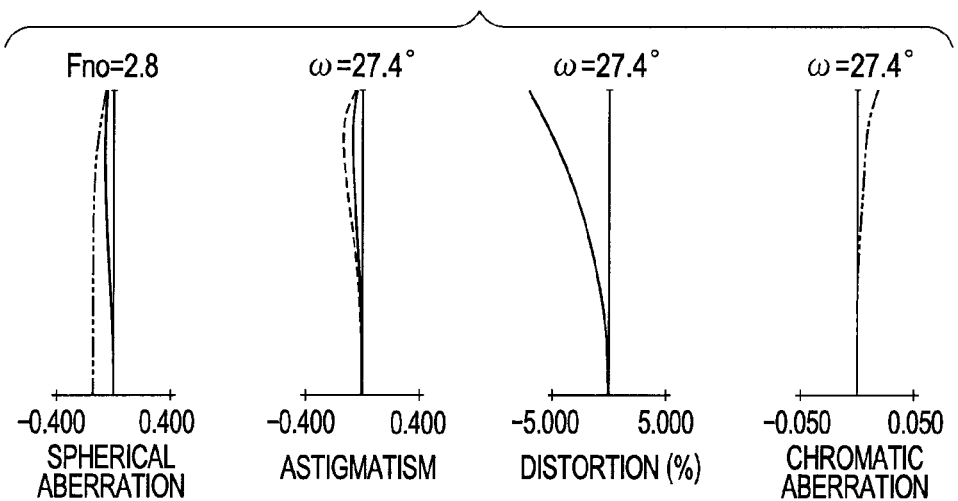
Figure 4B:
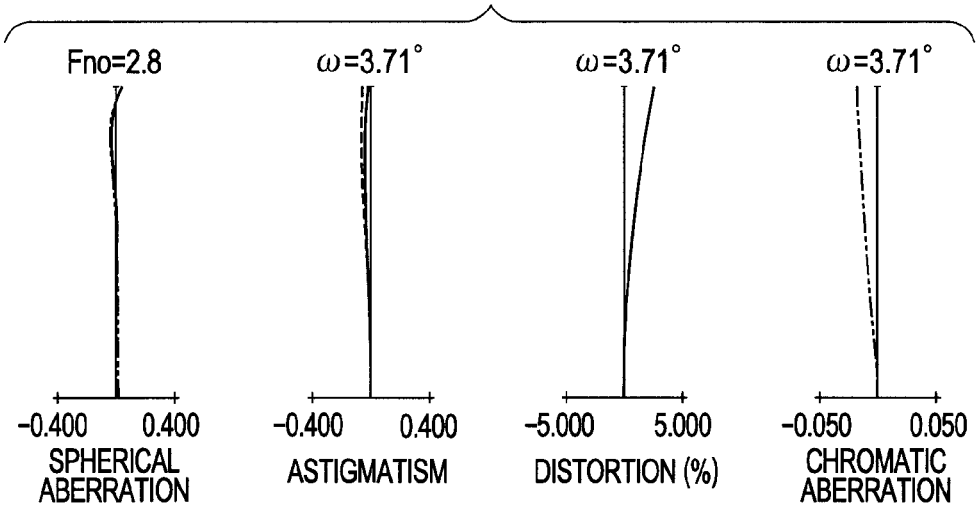
FIG. 4Ba is an aberration diagram at the telephoto end when focusing at an object distance of 7.0 m according to Embodiment 1 of the present invention.
Figure 4B:
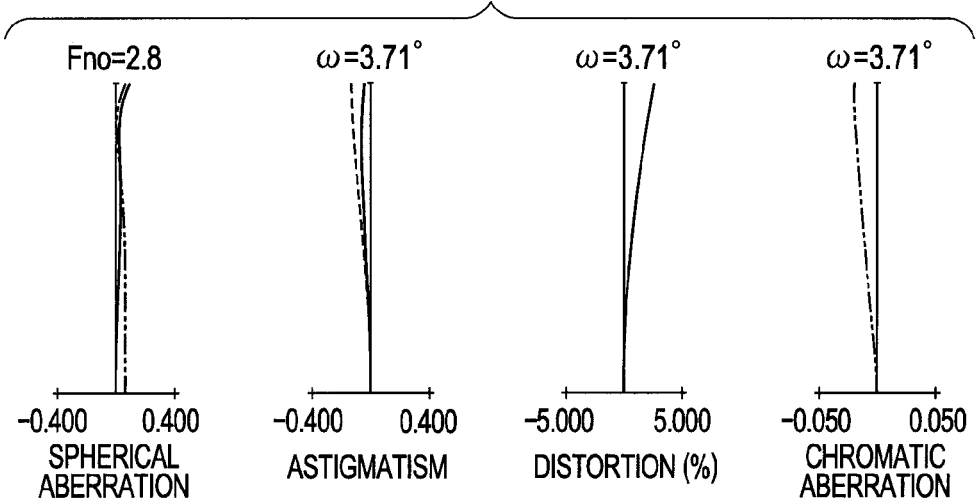
Figure 4B:
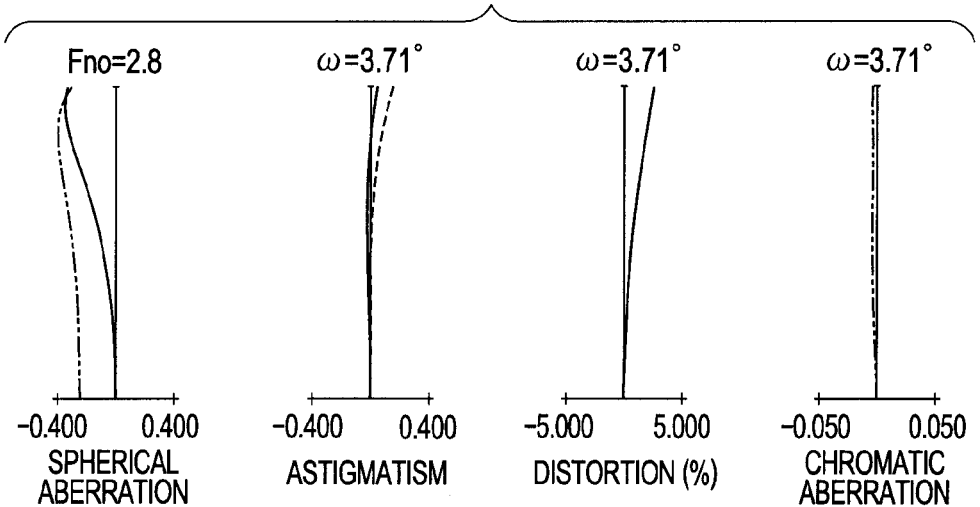

FIGS. 4Aa, 4Ab, and 4Ac are aberration diagrams of Numerical Embodiment 1 at a wide-angle end at object distances of 7.0 m, infinity, and close range (1.5 m), respectively. FIGS. 4Ba, 4Bb, and 4Bc are aberration diagrams of Numerical Embodiment 1 at a telephoto end at object distances of 7.0 m, infinity, and close range (1.5 m), respectively. Here, the object distance is a value with reference to the image plane. Note that, the aberration diagram of each embodiment illustrates spherical aberrations with respect to e-line (full line) and g-line (two-dot and dash line), and illustrates astigmatisms on a meridional image plane (meri) (dot line) with respect to the e-line and on a sagittal image plane (sagi) (solid line) with respect to the e-line. Lateral chromatic aberration is indicated with respect to g-line (two-dot and dash line). An F number is denoted by Fno, and a half angle of field is denoted by ω. In addition, the spherical aberration, the astigmatism, the distortion, and the lateral chromatic aberration are indicated in units of 0.4 mm, 0.4 mm, 5%, and 0.05 mm, respectively.

Numerical values corresponding to the respective expressions of this embodiment are shown in Table 1. In addition, values obtained when the breathing of this embodiment is defined as a ratio of a length variation of a focal length of the entire system at a wide-angle end at close range to a focal length of the entire system at a wide-angle end at the object distance of infinity are shown in Table 2. This embodiment satisfies the expressions (1) to (5) and achieves a zoom lens having a high magnification, a small size and lightweight, little aberration deviation due to focus adjustment, and little breathing.

Hereinafter, Numerical Embodiment 1 corresponding to Embodiment 1 of the present invention is described. In the following, in each of the numerical embodiments to be described below, "i" represents an order of a surface from the object side, "ri" represents a curvature radius of an i-th surface from the object side, "di" represents an interval between the i-th surface and the (i+1)th surface from the object side, and "ndi" and "vdi" respectively denote a refractive index and an Abbe constant of the i-th optical member. "BF" represents an air-equivalent back focus.

The aspherical shape is expressed in the following expression where an X axis corresponds to the optical axis, an H axis corresponds to an axis perpendicular to the optical axis, a traveling direction of light corresponds to a positive direction, "R" represents a paraxial curvature radius, "k" represents a conic constant, and "A4", "A6", "A8", "A10", and "A12" each denote an aspherical coefficient.

$$X = \frac{H^2/R}{1+\sqrt{1-(1+k)(H/R)^2}} + A4H^4 + A6H^6 + A8H^8 + A10H^{10} + A12H^{12}$$

Further, in numerical values of the numerical embodiments to be described below, "e-Z" means "$\times 10^{-Z}$".

Numerical Embodiment 1

Unit: mm

Surface data

| Surface Number | r | d | nd | vd | Effective diameter |
|---|---|---|---|---|---|
| 1 | −2169.523 | 9.00 | 1.51633 | 64.1 | 140.17 |
| 2 | −314.385 | 17.12 | | | 138.65 |
| 3 | −1314.817 | 3.00 | 1.69680 | 55.5 | 106.32 |
| 4 | 256.027 | 16.35 | | | 102.86 |
| 5 | −135.450 | 3.00 | 1.77250 | 49.6 | 102.49 |
| 6 | 214.527 | 10.00 | 1.80809 | 22.8 | 105.84 |
| 7 | −4416.376 | 2.00 | | | 106.31 |
| 8 | 265.280 | 16.00 | 1.60311 | 60.6 | 108.39 |
| 9* | −204.953 | 0.20 | | | 108.40 |
| 10 | 470.288 | 3.00 | 1.84666 | 23.8 | 105.34 |
| 11 | 133.708 | 0.78 | | | 103.29 |
| 12 | 140.997 | 17.00 | 1.43387 | 95.1 | 103.37 |
| 13 | −320.050 | 0.20 | | | 103.38 |
| 14 | 182.418 | 12.00 | 1.59240 | 68.3 | 101.75 |
| 15 | −590.022 | 0.20 | | | 100.97 |
| 16 | 149.424 | 8.00 | 1.59240 | 68.3 | 96.43 |
| 17 | 486.995 | (Variable) | | | 95.40 |
| 18 | 89.717 | 1.80 | 1.77250 | 49.6 | 48.24 |
| 19 | 31.533 | 10.06 | | | 41.62 |
| 20 | −118.868 | 1.50 | 1.60311 | 60.6 | 41.38 |
| 21 | 86.401 | 0.15 | | | 40.17 |
| 22 | 49.488 | 6.24 | 1.80518 | 25.4 | 40.06 |
| 23 | −15259.953 | 3.00 | | | 39.23 |
| 24 | −68.145 | 1.50 | 1.77250 | 49.6 | 39.12 |
| 25 | −3979.779 | (Variable) | | | 38.54 |
| 26 | −85.815 | 1.50 | 1.80400 | 46.6 | 35.00 |
| 27 | 321.459 | 3.50 | 1.92286 | 18.9 | 36.14 |
| 28 | −700.345 | (Variable) | | | 36.88 |
| 29 (Stop) | ∞ | 2.00 | | | 38.21 |
| 30 | 1156.972 | 4.20 | 1.62041 | 60.3 | 39.26 |
| 31 | −118.359 | 0.20 | | | 39.91 |
| 32 | 1169.967 | 4.20 | 1.62041 | 60.3 | 40.40 |
| 33 | −103.147 | 0.20 | | | 40.67 |
| 34 | 135.391 | 6.50 | 1.43875 | 94.9 | 40.54 |
| 35 | −71.283 | 1.60 | 1.84666 | 23.8 | 40.30 |
| 36 | −253.564 | 0.20 | | | 40.46 |
| 37 | 40.391 | 6.50 | 1.61800 | 63.3 | 40.10 |
| 38 | 170.242 | 30.53 | | | 39.05 |
| 39 | −157.350 | 1.20 | 2.00330 | 28.3 | 23.85 |
| 40 | 37.528 | 0.90 | | | 23.85 |
| 41 | 61.846 | 3.35 | 1.92286 | 18.9 | 23.95 |
| 42 | −1434.512 | 21.54 | | | 24.31 |
| 43 | −23.105 | 2.00 | 1.90366 | 31.3 | 29.49 |
| 44 | −29.181 | 0.15 | | | 31.82 |
| 45 | −1389.536 | 5.00 | 1.61800 | 63.3 | 34.54 |
| 46 | −51.387 | 0.15 | | | 35.25 |
| 47 | 52.270 | 5.00 | 1.48749 | 70.2 | 36.08 |
| 48 | 143.875 | | | | 35.63 |
| Image plane | ∞ | | | | |

Aspherical surface data
Ninth surface

K = −3.69523e+000   A4 = −1.63293e−008   A6 = 1.65333e−012
A8 = −2.91145e−016   A10 = 4.33793e−020   A12 = −3.27158e−024

Various data
Zoom ratio 8.0

| Focal length | 30.00 | 60.00 | 90.00 | 120.00 | 240.00 |
|---|---|---|---|---|---|
| F-number | 2.80 | 2.80 | 2.80 | 2.80 | 2.80 |
| Angle of field | 27.40 | 14.53 | 9.80 | 7.38 | 3.71 |
| Image height | 15.55 | 15.55 | 15.55 | 15.55 | 15.55 |
| Total lens length | 397.08 | 397.08 | 397.08 | 397.08 | 397.08 |
| BF | 43.65 | 43.65 | 43.65 | 43.65 | 43.65 |
| d17 | 0.70 | 48.07 | 68.46 | 80.51 | 102.64 |
| d25 | 107.72 | 49.84 | 25.57 | 13.22 | 5.48 |
| d28 | 2.50 | 13.01 | 16.89 | 17.19 | 2.80 |
| Entrance pupil position | 121.39 | 212.72 | 281.69 | 337.22 | 485.52 |
| Exit pupil position | −216.79 | −216.79 | −216.79 | −216.79 | −216.79 |
| Front principal point position | 147.94 | 258.90 | 340.59 | 401.93 | 504.36 |
| Rear principal point position | 13.65 | −16.35 | −46.35 | −76.35 | −196.35 |

Zoom lens unit data

| Unit | First surface | Focal length | Lens structure length | Front principal point position | Rear principal point position |
|---|---|---|---|---|---|
| 1 | 1 | 150.19 | 117.84 | 93.74 | 15.23 |
| 2 | 18 | −41.06 | 24.24 | 7.07 | −10.78 |
| 3 | 26 | −130.63 | 5.00 | −0.50 | −3.15 |
| 4 | 29 | 68.89 | 95.42 | 40.89 | −116.21 |

Embodiment 2

Figure 5A:
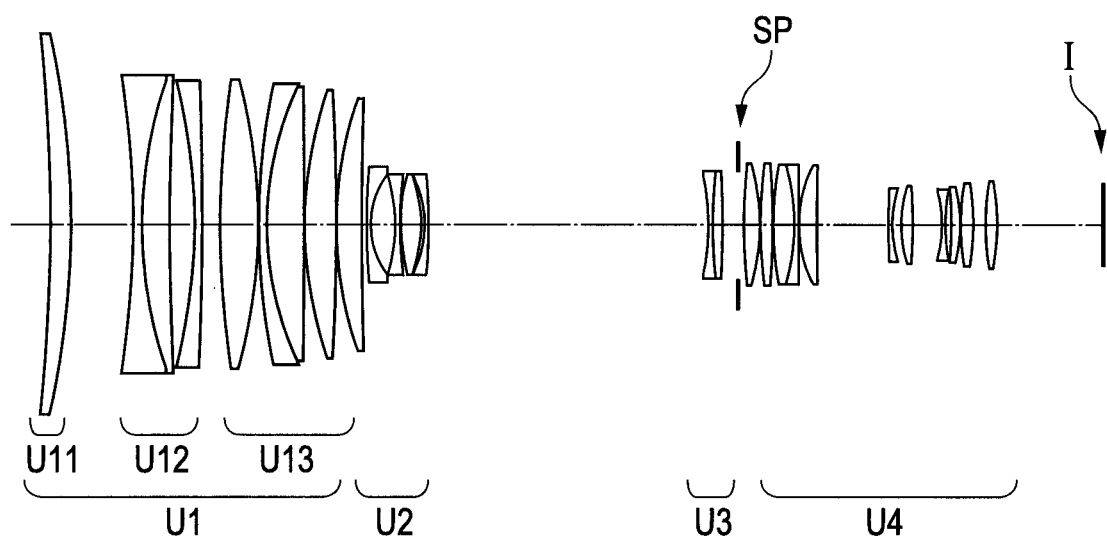
FIG. 5A is a lens cross sectional view at the wide-angle end when focusing at infinity according to Embodiment 2 of the present invention.
Figure 5B:
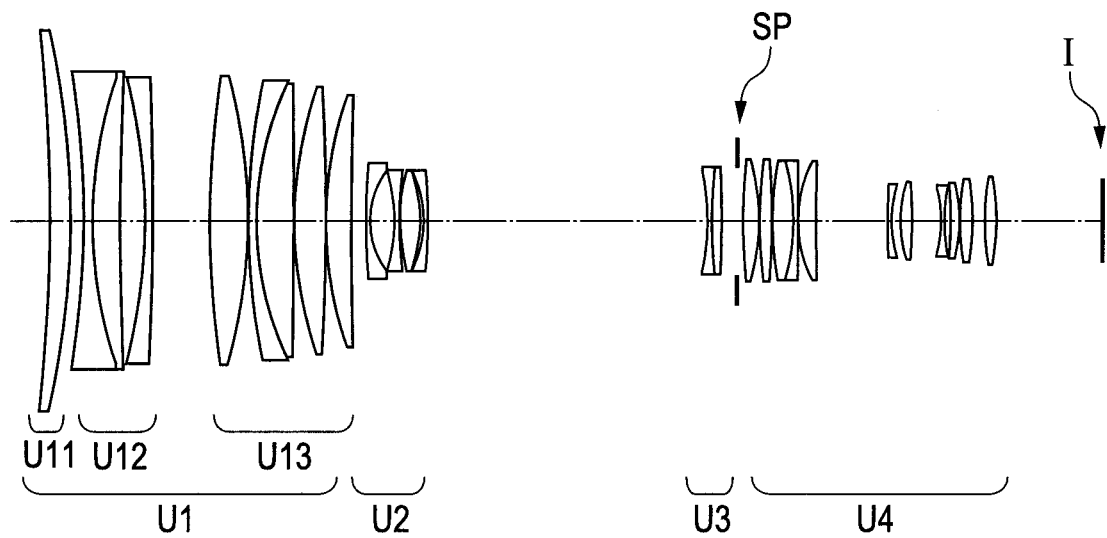
FIG. 5B is a lens cross sectional view at the wide-angle end when focusing at close range according to Embodiment 2 of the present invention.

FIGS. 5A and 5B are lens cross sectional views of a zoom lens according to Embodiment 2 (Numerical Embodiment 2) of the present invention at a wide-angle end in which the object distance is infinity and close range, respectively.

In FIGS. 5A and 5B, the zoom lens of this embodiment includes, in order from the object side (left side), a focus lens unit having positive refractive power as the first lens unit U1, a variator having negative refractive power for varying magnification as a second lens unit U2, a compensator having negative refractive power as a third lens unit U3, a stop SP, an imaging lens unit having positive refractive power and an image forming action as a fourth lens unit U4, and an image pickup surface I. In this embodiment, the second lens unit U2 and the third lens unit U3 constitute the magnification-varying lens unit. The second lens unit U2 (variator) varies magnification from the wide-angle end to the telephoto end by moving monotonously on the optical axis toward the image plane side. The third lens unit U3 (compensator) moves non-linearly on the optical axis in order to correct image plane variation accompanying the magnification variation.

A structure of the first lens unit U1 in this embodiment corresponds to first to seventeenth surfaces. The first lens unit U1 includes the first sub-lens unit U11 having positive refractive power, the second sub-lens unit U12 having negative refractive power that moves 19.18 mm toward the object side from the object distance of infinity to close range, and the third sub-lens unit U13 having positive refractive power that moves 3.84 mm toward the object side from the object distance of infinity to close range. In this embodiment, the entire third sub-lens unit U13 corresponds to the sub-third sub-lens unit U13f.

Figure 6A:
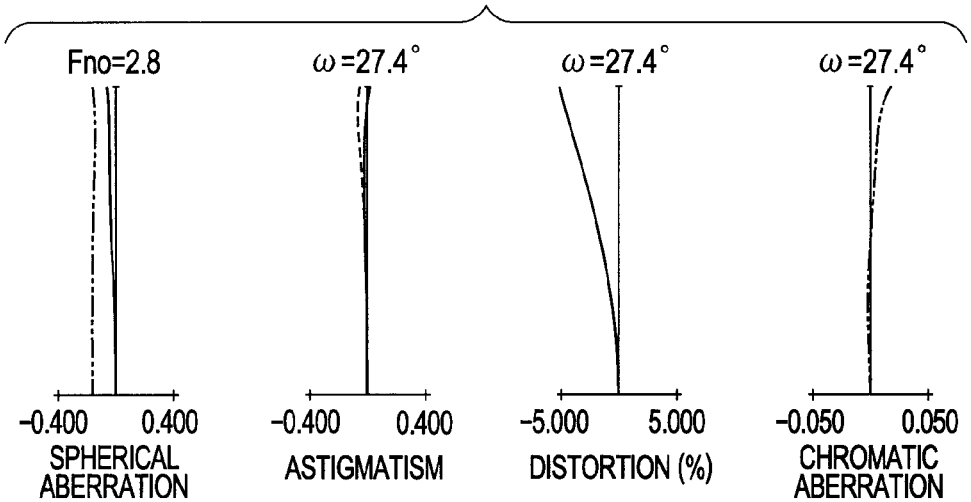
FIG. 6Aa is an aberration diagram at the wide-angle end when focusing at an object distance of 7.0 m according to Embodiment 2 of the present invention.
Figure 6A:
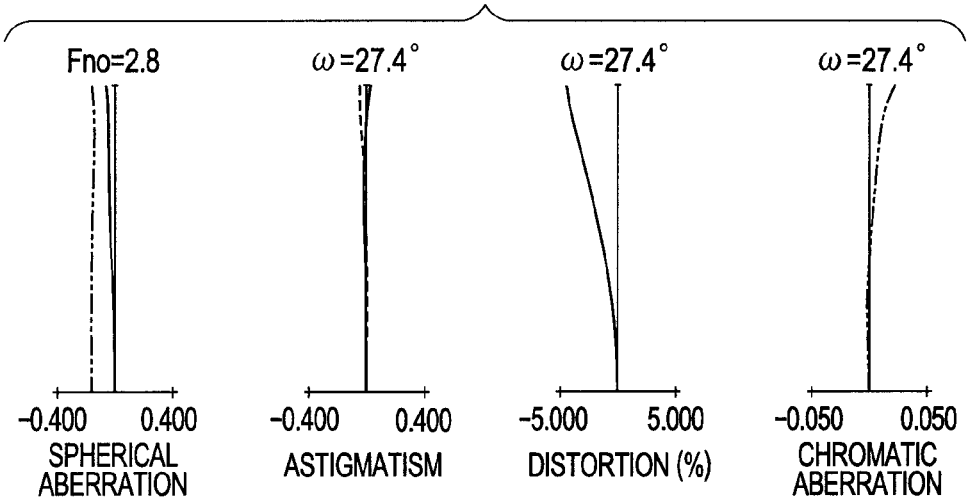
Figure 6A:
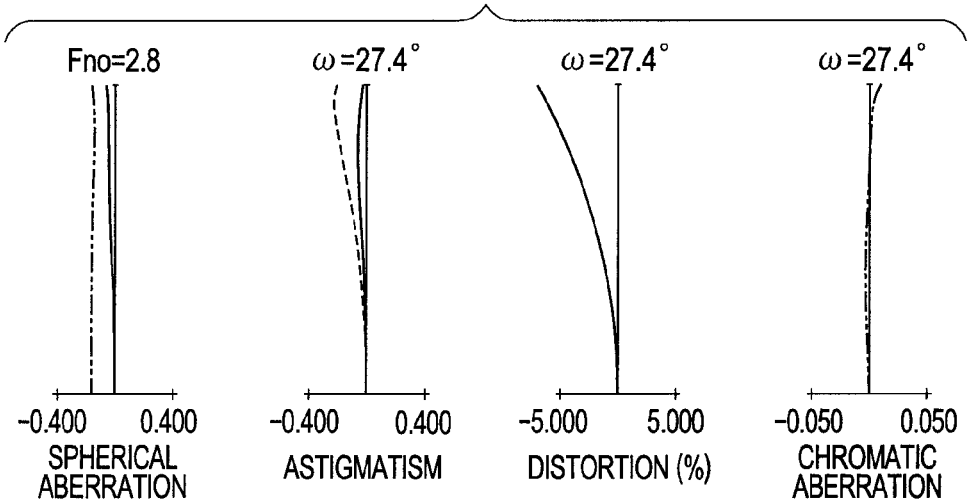
Figure 6B:
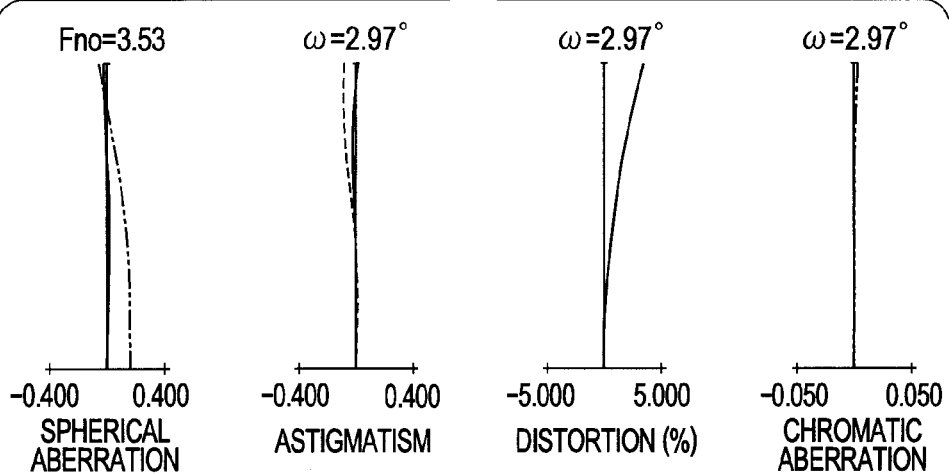
FIG. 6Ba is an aberration diagram at the telephoto end when focusing at an object distance of 7.0 m according to Embodiment 2 of the present invention.
Figure 6B:
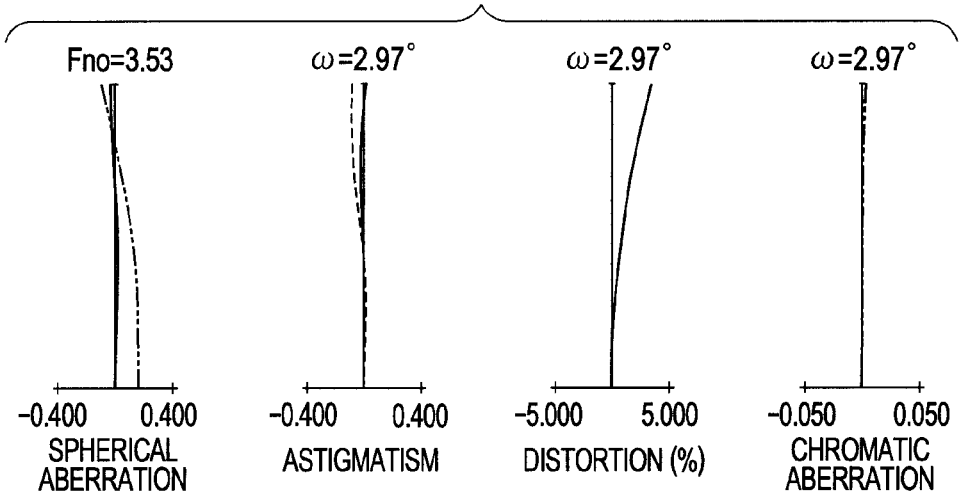
Figure 6B:
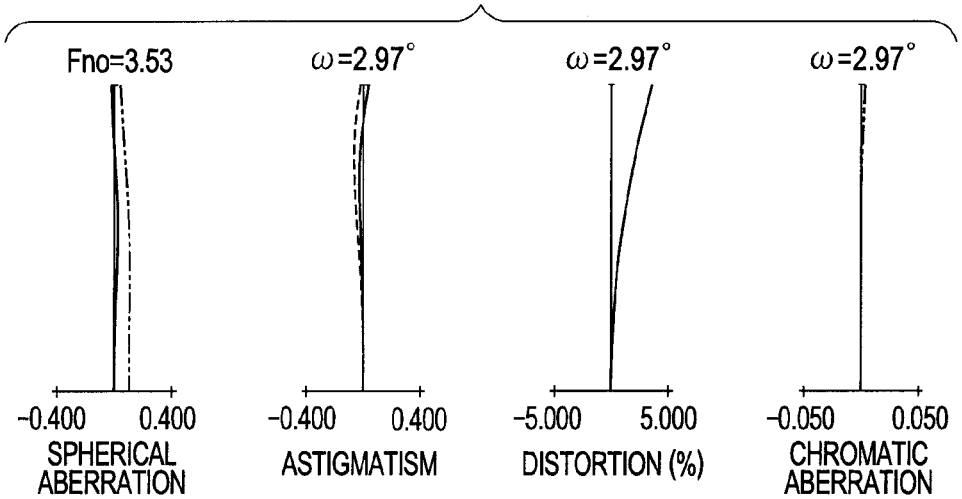

FIGS. 6Aa, 6Ab, and 6Ac illustrate aberration diagrams of Numerical Embodiment 2 at a wide-angle end at object distances of 7.0 m, infinity, and close range (1.8 m), respectively. FIGS. 6Ba, 6Bb, and 6Bc illustrate aberration diagrams of Numerical Embodiment 2 at a telephoto end at object distances of 7.0 m, infinity, and close range (1.8 m), respectively. Here, the object distance is a value with reference to the image plane.

Numerical values corresponding to the respective expressions of this embodiment are shown in Table 1. In addition, values obtained when the breathing of this embodiment is defined as a ratio of a length variation of a focal length of the entire system at a wide-angle end at close range to a focal length of the entire system at a wide-angle end at the object distance of infinity are shown in Table 2. This embodiment satisfies the expressions (1) to (5) and achieves a zoom lens having a high magnification, a small size and light weight, little aberration deviation due to focus adjustment, and little breathing.

Numerical Embodiment 2

| Unit: mm | | | | |
|---|---|---|---|---|
| Surface data | | | | |
| Surface Number | r | d | nd | vd | Effective diameter |
|---|---|---|---|---|---|
| 1 | −650.810 | 8.00 | 1.51633 | 64.1 | 139.91 |
| 2 | −319.344 | 24.19 | | | 137.49 |
| 3 | −328.288 | 3.30 | 1.77250 | 49.6 | 109.64 |
| 4 | 157.776 | 10.68 | 1.80809 | 22.8 | 105.12 |
| 5 | 993.077 | 9.79 | | | 104.52 |
| 6 | −206.150 | 3.20 | 1.88300 | 40.8 | 104.05 |
| 7 | −941.784 | 6.56 | | | 104.94 |
| 8 | 367.686 | 14.61 | 1.60311 | 60.6 | 106.12 |
| 9* | −198.164 | 0.20 | | | 105.94 |
| 10 | 248.955 | 3.00 | 2.00069 | 25.5 | 102.59 |
| 11 | 120.008 | 0.32 | | | 99.68 |
| 12 | 121.240 | 14.00 | 1.43387 | 95.1 | 99.73 |
| 13 | −4296.582 | 0.20 | | | 99.37 |
| 14 | 149.314 | 12.00 | 1.43387 | 95.1 | 97.77 |
| 15 | −932.824 | 0.20 | | | 96.93 |
| 16 | 147.522 | 9.62 | 1.59240 | 68.3 | 92.17 |
| 17 | 1515.868 | (Variable) | | | 90.48 |
| 18* | 219.701 | 1.50 | 1.81600 | 46.6 | 41.88 |
| 19 | 30.528 | 9.87 | | | 36.41 |
| 20 | −50.291 | 1.30 | 1.61800 | 63.3 | 36.21 |
| 21 | 153.783 | 0.15 | | | 36.54 |
| 22 | 63.436 | 8.50 | 1.72047 | 34.7 | 36.99 |
| 23 | −47.429 | 1.13 | | | 36.75 |
| 24 | −38.906 | 1.30 | 1.61800 | 63.3 | 36.45 |
| 25 | −229.319 | (Variable) | | | 36.05 |
| 26 | −79.137 | 1.50 | 1.78800 | 47.4 | 37.16 |
| 27 | 169.160 | 4.00 | 1.80809 | 22.8 | 38.76 |
| 28 | −419.524 | (Variable) | | | 39.54 |
| 29 (Stop) | ∞ | 2.00 | | | 42.93 |
| 30 | 266.917 | 6.00 | 1.62041 | 60.3 | 44.45 |
| 31 | −84.540 | 0.20 | | | 44.95 |
| 32 | 169.157 | 5.00 | 1.62041 | 60.3 | 45.22 |
| 33 | −226.121 | 0.20 | | | 45.06 |
| 34 | 133.617 | 8.00 | 1.49700 | 81.5 | 44.31 |
| 35 | −69.585 | 1.50 | 2.00069 | 25.5 | 43.59 |
| 36 | 1244.843 | 0.15 | | | 43.45 |
| 37 | 48.963 | 7.00 | 1.61800 | 63.3 | 43.35 |
| 38 | 554.491 | 28.23 | | | 42.46 |
| 39 | 473.327 | 1.00 | 1.90366 | 31.3 | 26.80 |
| 40 | 41.037 | 3.84 | | | 26.43 |
| 41 | 50.158 | 4.50 | 1.92286 | 18.9 | 27.90 |
| 42 | −206.901 | 11.71 | | | 27.73 |
| 43 | −44.189 | 1.00 | 2.00330 | 28.3 | 24.75 |
| 44 | 59.859 | 2.55 | | | 25.39 |
| 45 | −133.347 | 3.50 | 1.51633 | 64.1 | 25.86 |
| 46 | −55.998 | 0.15 | | | 27.35 |
| 47 | 95.351 | 5.00 | 1.51633 | 64.1 | 29.32 |
| 48 | −88.263 | 5.01 | | | 30.11 |
| 49 | 106.784 | 4.50 | 1.48749 | 70.2 | 32.25 |
| 50 | −98.105 | | | | 32.42 |
| Image plane | ∞ | | | | |

| Aspherical surface data |
|---|
| Ninth surface |

K = −2.18399e+000   A4 = −3.07579e−009   A6 = 2.42180e−013
A8 = −1.76920e−016  A10 = 7.90680e−020   A12 = −1.42366e−023

Eighteenth surface

K = 6.98145e+001    A4 = −2.76274e−007   A6 = −6.04505e−010
A8 = −8.68550e−013  A10 = 1.27664e−015   A12 = −2.80810e−018

| Various data Zoom ratio 10.00 | | | | | |
|---|---|---|---|---|---|
| Focal length | 30.00 | 60.00 | 90.00 | 120.00 | 300.00 |
| F-number | 2.80 | 2.80 | 2.80 | 2.80 | 3.53 |
| Angle of field | 27.40 | 14.53 | 9.80 | 7.38 | 2.97 |
| Image height | 15.55 | 15.55 | 15.55 | 15.55 | 15.55 |
| Total lens length | 407.46 | 407.46 | 407.46 | 407.46 | 407.46 |
| BF | 41.49 | 41.49 | 41.49 | 41.49 | 41.49 |
| d17 | 1.72 | 48.61 | 68.64 | 80.39 | 106.80 |
| d25 | 108.04 | 50.99 | 26.89 | 14.29 | 7.06 |
| d28 | 6.05 | 16.21 | 20.28 | 21.13 | 1.95 |
| Entrance pupil position | 124.11 | 222.91 | 301.03 | 366.97 | 638.27 |
| Exit pupil position | −127.39 | −127.39 | −127.39 | −127.39 | −127.39 |
| Front principal point position | 148.78 | 261.60 | 343.07 | 401.70 | 405.34 |
| Rear principal point position | 11.49 | −18.51 | −48.51 | −78.51 | −258.51 |

| Zoom lens unit data | | | | | |
|---|---|---|---|---|---|
| Unit | First surface | Focal length | Lens structure length | Front principal point position | Rear principal point position |
| 1 | 1 | 151.36 | 119.87 | 91.34 | 6.26 |
| 2 | 18 | −38.53 | 23.75 | 1.59 | −16.79 |
| 3 | 26 | −127.28 | 5.50 | −0.77 | −3.83 |
| 4 | 29 | 59.42 | 101.04 | 17.74 | −102.10 |

Embodiment 3

Figure 7A:
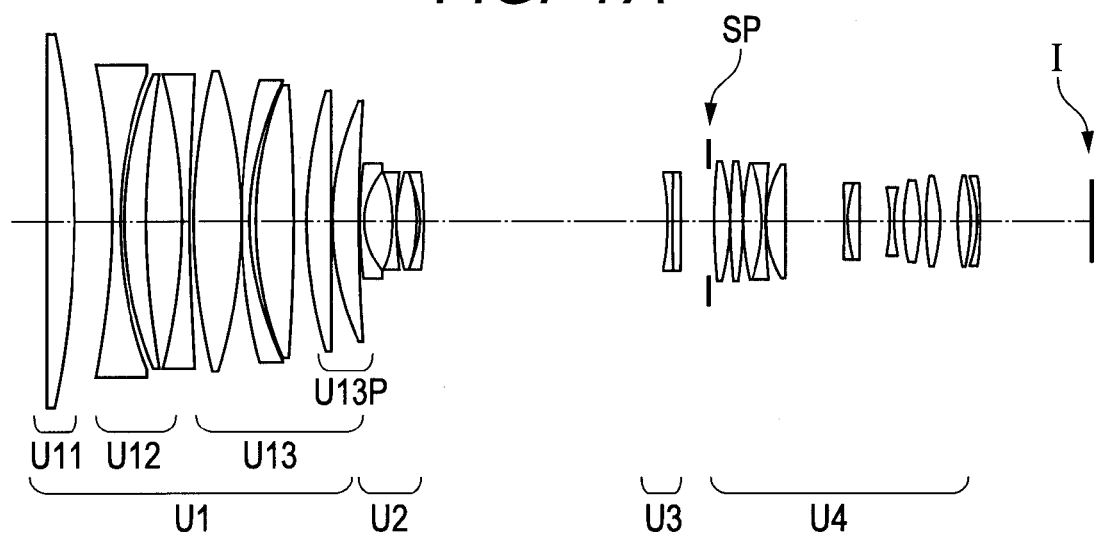
FIG. 7A is a lens cross sectional view at the wide-angle end when focusing at infinity according to Embodiment 3 of the present invention.
Figure 7B:
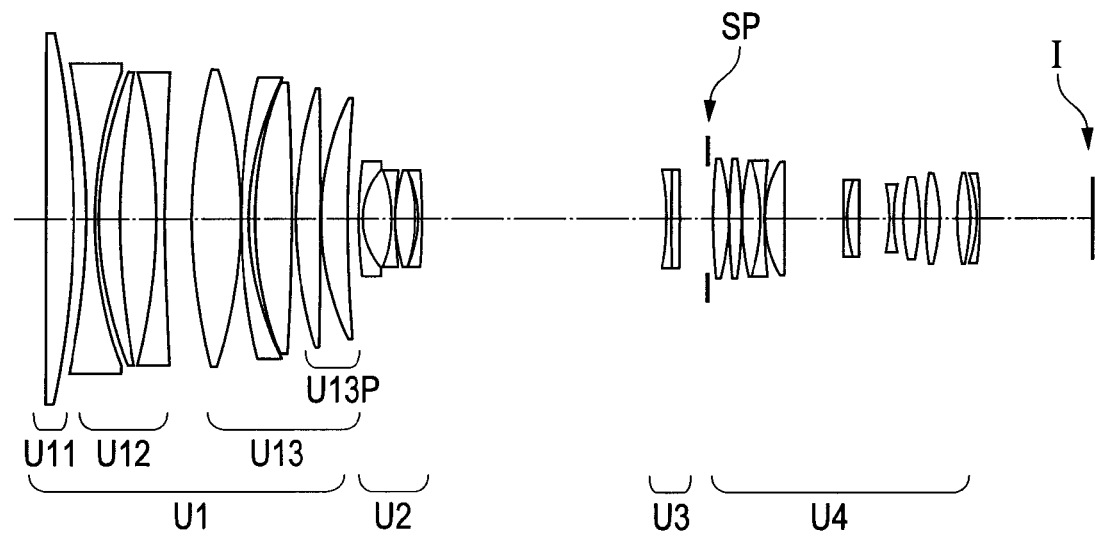
FIG. 7B is a lens cross sectional view at the wide-angle end when focusing at close range according to Embodiment 3 of the present invention.

FIGS. 7A and 7B are lens cross sectional views of a zoom lens according to Embodiment 3 (Numerical Embodiment 3) of the present invention at a wide-angle end in which the object distance is infinity and close range, respectively.

FIGS. 7A and 7B illustrate, in order from the object side (left side), a focus lens unit having positive refractive power as the first lens unit U1, a variator having negative refractive power for varying magnification as a second lens unit U2, a compensator having negative refractive power as a third lens unit U3, a stop SP, an imaging lens unit having positive refractive power and an image forming action as a fourth lens unit U4, and an image pickup surface I. In this embodiment, the second lens unit U2 and the third lens unit U3 constitute the magnification-varying lens unit. The second lens unit U2 (variator) varies magnification from the wide-angle end to the telephoto end by moving monotonously on the optical axis toward the image plane side. The third lens unit U3 (compensator) moves non-linearly on the optical axis in order to correct image plane variation accompanying the magnification variation.

A structure of the first lens unit U1 in this embodiment corresponds to first to seventeenth surfaces. The first lens unit U1 includes the first sub-lens unit U11 having positive refractive power, the second sub-lens unit U12 having negative refractive power that moves 9.68 mm toward the object side from the object distance of infinity to the close range, and the third sub-lens unit U18 having positive refractive power. Further, a lens unit U13p, which is included in the third sub-lens unit U13 and has positive refractive power, moves 3.87 mm toward the object side from the object distance of infinity to close range. Therefore, in this embodiment, the lens unit U13p corresponds to the sub-third sub-lens unit U13f.

Figure 8A:
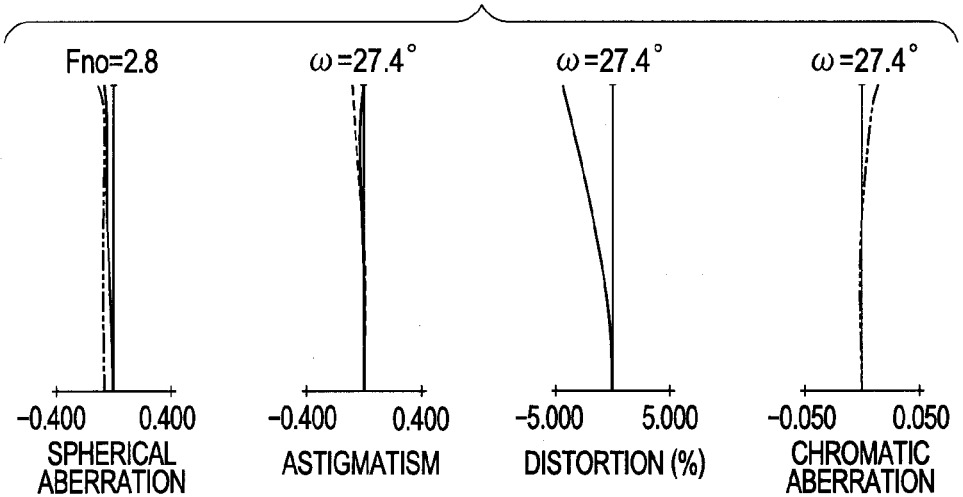
FIG. 8Aa is an aberration diagram at the wide-angle end when focusing at an object distance of 7.0 m according to Embodiment 3 of the present invention.
Figure 8A:
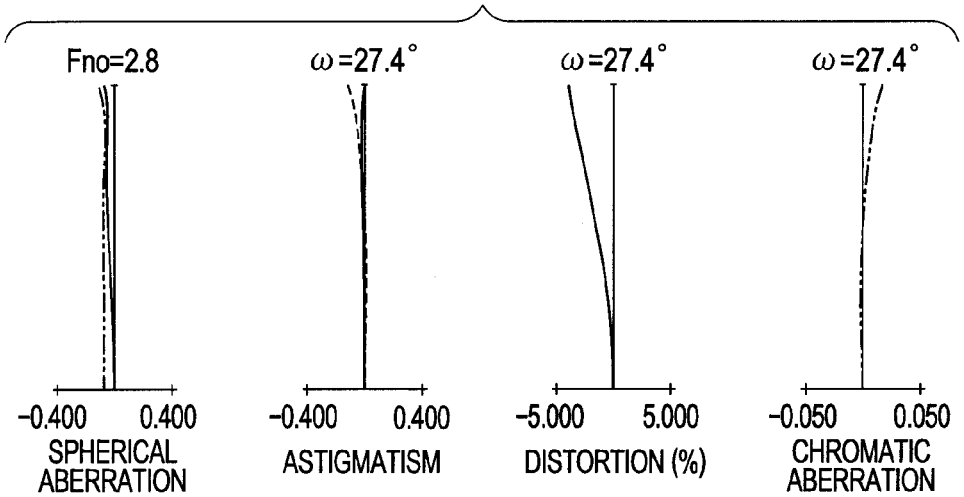
Figure 8A:
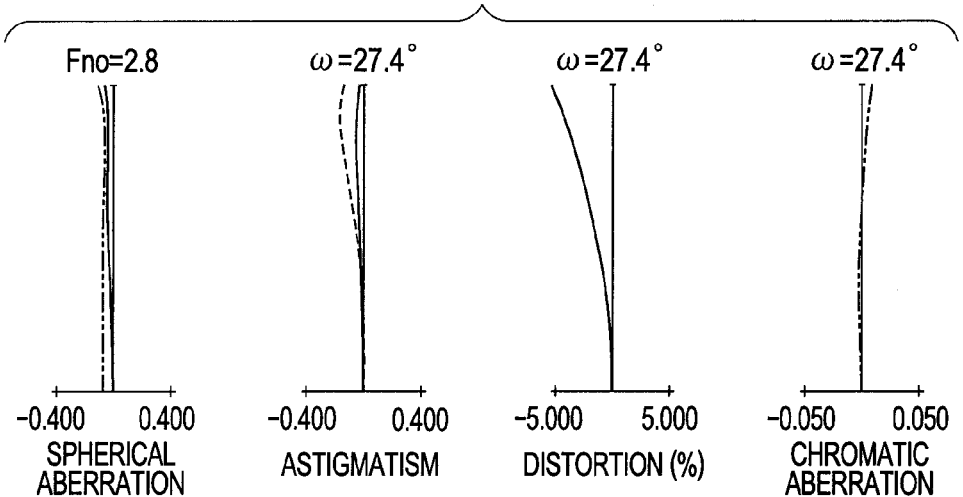
Figure 8B:
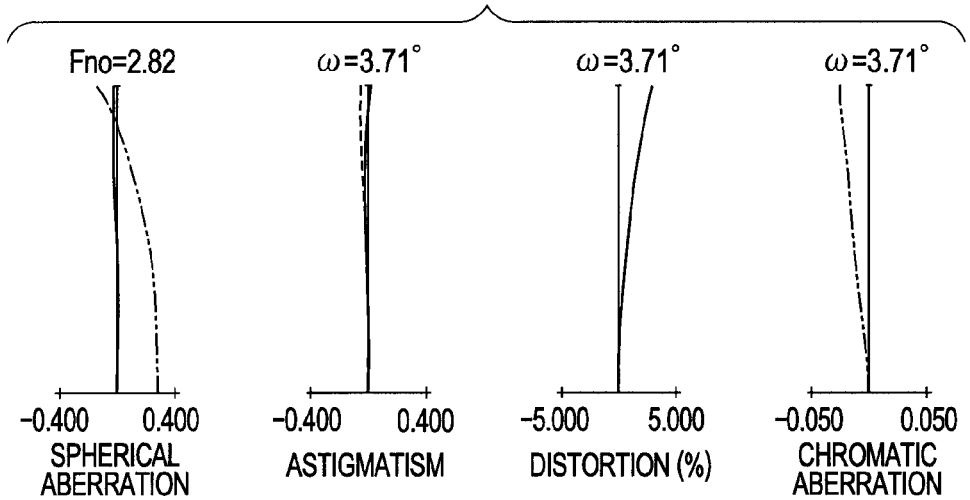
FIG. 8Ba is an aberration diagram at the telephoto end when focusing at an object distance of 7.0 m according to Embodiment 3 of the present invention.
Figure 8B:
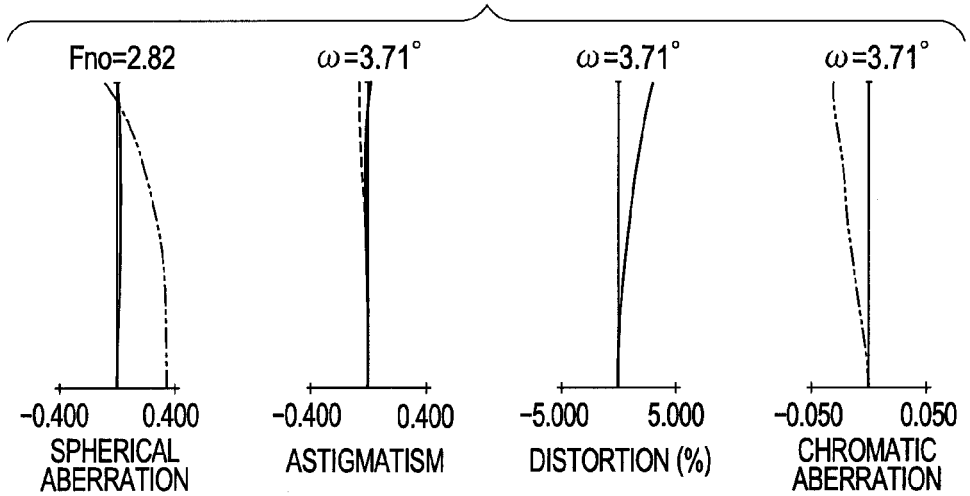
Figure 8B:
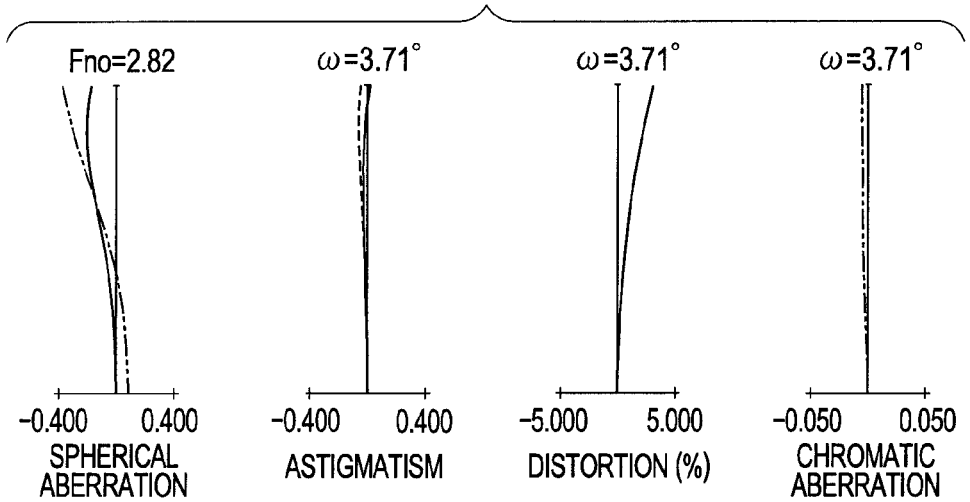

FIGS. 8Aa, 8Ab, and 8Ac are aberration diagrams of Numerical Embodiment 3 at a wide-angle end at object distances of 7.0 m, infinity, and close range (1.8 m), respectively. FIGS. 8Ba, 8Bb, and 8Bc are aberration diagrams of Numerical Embodiment 3 at a telephoto end at object distances of 7.0 m, infinity, and close range (1.8 m), respectively. Here, the object distance is a value with reference to the image plane.

Numerical values corresponding to the respective expressions of this embodiment are shown in Table 1. In addition, values obtained when the breathing of this embodiment is defined as a ratio of a length variation of a focal length of the entire system at a wide-angle end at close range to a focal length of the entire system at a wide-angle end at the object distance of infinity are shown in Table 2. This embodiment satisfies the expressions (1) to (5) and achieves a zoom lens having a high magnification, a small size and light weight, little aberration deviation due to focus adjustment, and little breathing.

Numerical Embodiment 3

Unit: mm

Surface data

| Surface Number | r | d | nd | vd | Effective diameter |
|---|---|---|---|---|---|
| 1 | −6789.500 | 10.50 | 1.60311 | 60.6 | 138.74 |
| 2 | −343.710 | 14.71 | | | 136.28 |
| 3 | −266.492 | 3.30 | 1.69680 | 55.5 | 115.61 |
| 4 | 162.714 | 1.08 | | | 109.44 |
| 5 | 142.133 | 8.50 | 1.80809 | 22.8 | 109.30 |
| 6 | 291.958 | 13.88 | | | 108.47 |
| 7 | −211.816 | 3.20 | 1.77250 | 49.6 | 108.01 |
| 8 | 815.467 | 1.10 | | | 109.08 |
| 9 | 208.910 | 19.00 | 1.60311 | 60.6 | 110.87 |
| 10* | −174.951 | 0.20 | | | 110.72 |
| 11 | 217.741 | 3.10 | 1.84666 | 23.8 | 104.22 |
| 12 | 112.077 | 2.32 | | | 100.76 |
| 13 | 133.853 | 14.64 | 1.43387 | 95.1 | 100.78 |
| 14 | −707.405 | 5.00 | | | 100.26 |
| 15 | 161.107 | 9.76 | 1.43387 | 95.1 | 95.88 |
| 16 | −22208.830 | 0.20 | | | 94.90 |
| 17 | 106.014 | 10.19 | 1.49700 | 81.5 | 88.93 |
| 18 | 512.264 | (Variable) | | | 87.34 |
| 19* | 227.378 | 1.50 | 1.77250 | 49.6 | 42.76 |
| 20 | 29.039 | 11.27 | | | 36.47 |
| 21 | −49.662 | 1.20 | 1.61800 | 63.3 | 35.74 |
| 22 | 139.946 | 0.15 | | | 35.82 |
| 23 | 62.790 | 8.20 | 1.72047 | 34.7 | 36.13 |
| 24 | −48.295 | 1.07 | | | 35.82 |
| 25 | −38.287 | 1.20 | 1.61800 | 63.3 | 35.73 |
| 26 | −220.222 | (Variable) | | | 35.28 |
| 27 | −74.007 | 1.50 | 1.75500 | 52.3 | 34.44 |
| 28 | 377.371 | 3.50 | 1.92286 | 18.9 | 35.73 |
| 29 | −570.601 | (Variable) | | | 36.54 |
| 30 (Stop) | ∞ | 1.80 | | | 42.36 |
| 31 | 177.912 | 6.20 | 1.61800 | 63.3 | 43.96 |
| 32 | −82.278 | 0.20 | | | 44.33 |
| 33 | 194.410 | 4.50 | 1.60311 | 60.6 | 44.29 |
| 34 | −172.682 | 0.20 | | | 44.12 |
| 35 | 98.865 | 7.50 | 1.48749 | 70.2 | 42.88 |
| 36 | −68.090 | 1.50 | 2.00069 | 25.5 | 42.25 |
| 37 | 189.781 | 0.20 | | | 41.75 |
| 38 | 43.490 | 7.50 | 1.58913 | 61.1 | 42.01 |
| 39 | −2545.279 | 22.85 | | | 41.28 |
| 40 | −236.294 | 1.00 | 1.88300 | 40.8 | 27.70 |
| 41 | 40.169 | 5.00 | 1.92286 | 18.9 | 26.77 |
| 42 | 6060.276 | 12.05 | | | 26.06 |
| 43 | −42.798 | 1.00 | 1.88300 | 40.8 | 23.46 |
| 44 | 47.570 | 3.85 | | | 24.49 |
| 45 | 60.216 | 6.41 | 1.51633 | 64.1 | 29.07 |
| 46 | −58.866 | 2.43 | | | 30.30 |
| 47 | 116.213 | 5.61 | 1.48749 | 70.2 | 32.68 |
| 48 | −61.471 | 6.77 | | | 33.08 |
| 49 | 81.277 | 5.08 | 1.48749 | 70.2 | 33.14 |
| 50 | −87.099 | 2.63 | | | 32.90 |
| 51 | −46.195 | 1.30 | 1.80518 | 25.4 | 32.40 |
| 52 | −101.262 | | | | 32.76 |
| Image plane | ∞ | | | | |

Aspherical surface data

Tenth surface

K = −1.89696e+000   A4 = 4.04225e−009   A6 = 5.23730e−013
A8 = 8.64765e−016   A10 = −2.63688e−019   A12 = 2.72307e−023

Nineteenth surface

K = 6.87039e+001   A4 = 2.43632e−007   A6 = −6.90320e−010
A8 = 6.83337e−013   A10 = −2.58097e−015   A12 = 1.85224e−018

Various data
Zoom ratio 8.00

| Focal length | 30.00 | 60.00 | 90.00 | 120.00 | 240.00 |
|---|---|---|---|---|---|
| F-number | 2.80 | 2.80 | 2.80 | 2.80 | 2.82 |
| Angle of field | 27.40 | 14.53 | 9.80 | 7.38 | 3.71 |
| Image height | 15.55 | 15.55 | 15.55 | 15.55 | 15.55 |
| Total lens length | 407.85 | 407.85 | 407.85 | 407.85 | 407.85 |
| BF | 44.83 | 44.83 | 44.83 | 44.83 | 44.83 |
| d18 | 0.70 | 43.30 | 61.50 | 72.16 | 91.46 |
| d26 | 95.35 | 43.12 | 21.48 | 10.61 | 4.11 |
| d29 | 11.12 | 20.74 | 24.19 | 24.39 | 11.60 |
| Entrance pupil position | 125.25 | 222.84 | 300.65 | 367.20 | 575.78 |
| Exit pupil position | −153.52 | −153.52 | −153.52 | −153.52 | −153.52 |
| Front principal point position | 150.71 | 264.69 | 349.82 | 414.61 | 525.39 |
| Rear principal point position | 14.83 | −15.17 | −45.17 | −75.17 | −195.17 |

-continued

Unit: mm

Zoom lens unit data

| Unit | First surface | Focal length | Lens structure length | Front principal point position | Rear principal point position |
|---|---|---|---|---|---|
| 1 | 1 | 142.08 | 120.68 | 87.27 | 1.12 |
| 2 | 19 | −36.47 | 24.59 | 2.17 | −17.06 |
| 3 | 27 | −123.50 | 5.00 | −0.59 | −3.26 |
| 4 | 30 | 64.32 | 105.59 | 26.44 | −108.63 |

Embodiment 4

Figure 9A:
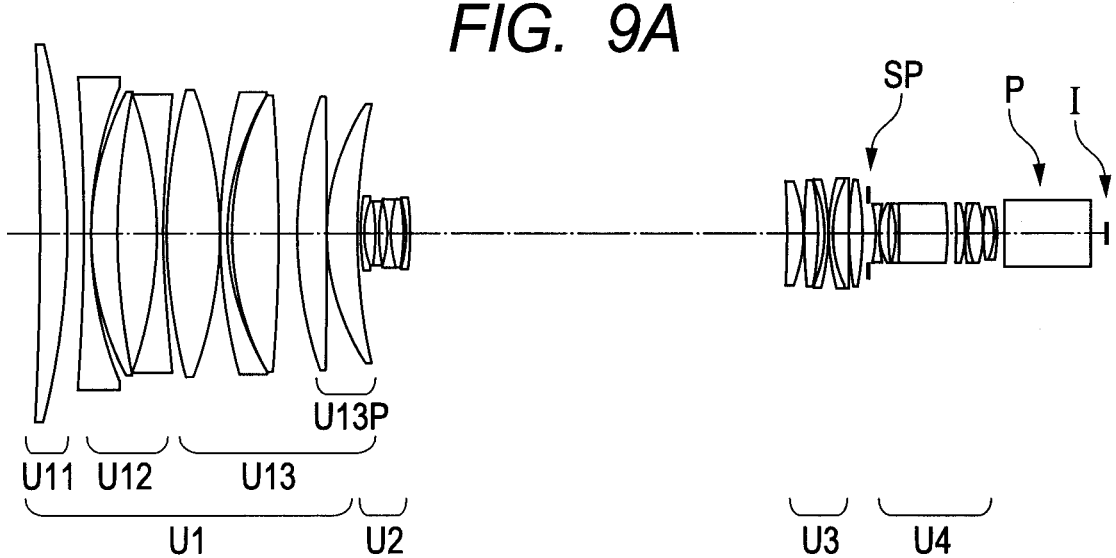
FIG. 9A is a lens cross sectional view at the wide-angle end when focusing at infinity according to Embodiment 4 of the present invention.
Figure 9B:
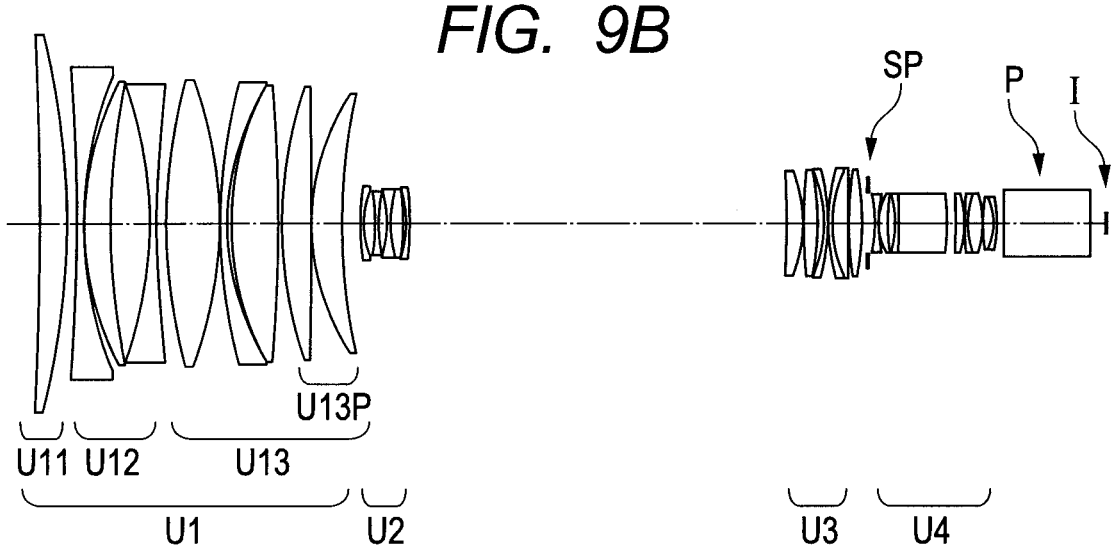
FIG. 9B is a lens cross sectional view at the wide-angle end when focusing at close range according to Embodiment 4 of the present invention.

FIGS. 9A and 9B are lens cross sectional views of a zoom lens according to Embodiment 4 (Numerical Embodiment 4) of the present invention at a wide-angle end in which the object distance is infinity and close range, respectively.

In FIGS. 9A and 9B, the zoom lens of this embodiment includes, in order from the object side, a focus lens unit having positive refractive power as the first lens unit U1, a variator having negative refractive power for varying magnification as a second lens unit U2, a compensator having positive refractive power as a third lens unit U3, a stop SP, an imaging lens unit having positive refractive power and an image forming action as a fourth lens unit U4, a glass block P equivalent to a color separation prism, and an image pickup surface I. In this embodiment, the second lens unit U2 and the third lens unit U3 constitute the magnification-varying lens unit. The second lens unit U2 (variator) varies magnification from the wide-angle end to the telephoto end by moving monotonously on the optical axis toward the image plane side. The third lens unit U3 (compensator) moves on the optical axis toward the object side in order to correct image plane variation accompanying the magnification variation.

A structure of the first lens unit U1 in this embodiment corresponds to first to seventeenth surfaces. The first lens unit U1 includes the first sub-lens unit U11 having positive refractive power, the second sub-lens unit U12 having negative refractive power that moves 4.67 mm toward the object side from the object distance of infinity to close range, and the third sub-lens unit U13 having positive refractive power. Further, a lens unit U13p, which is included in the third sub-lens unit U13 and has positive refractive power, moves 9.33 mm toward the object side from the object distance of infinity to close range. Therefore, in this embodiment, the lens unit U13p corresponds to the sub-third sub-lens unit U13f.

Figure 10A:
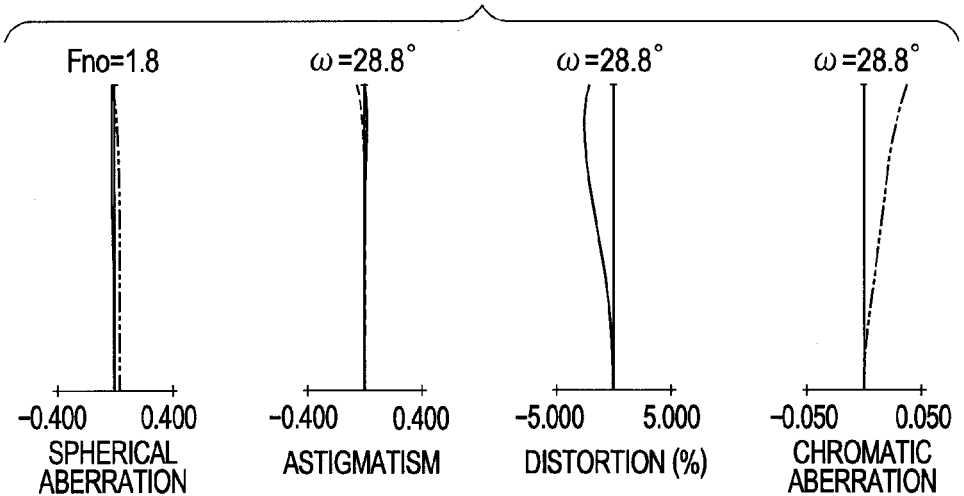
FIG. 10Aa is an aberration diagram at the wide-angle end when focusing at an object distance of 12.0 m according to Embodiment 4 of the present invention.
Figure 10A:
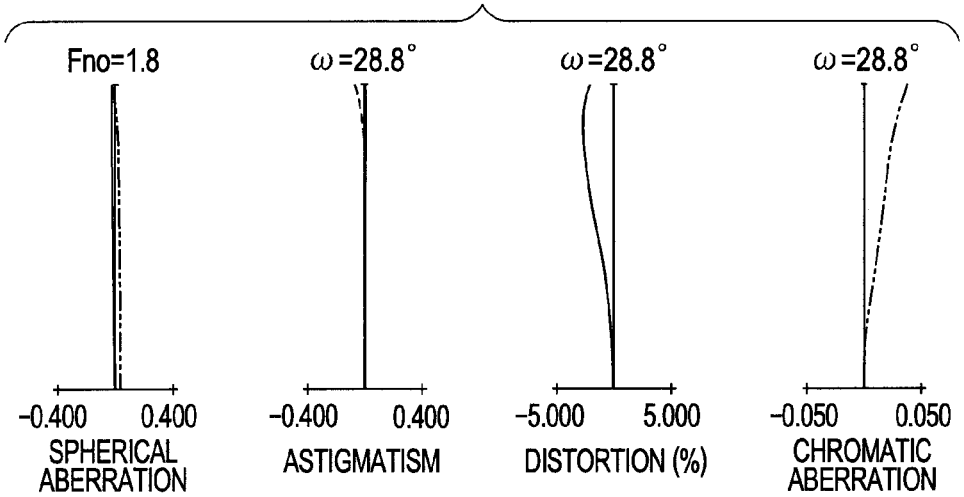
Figure 10A:
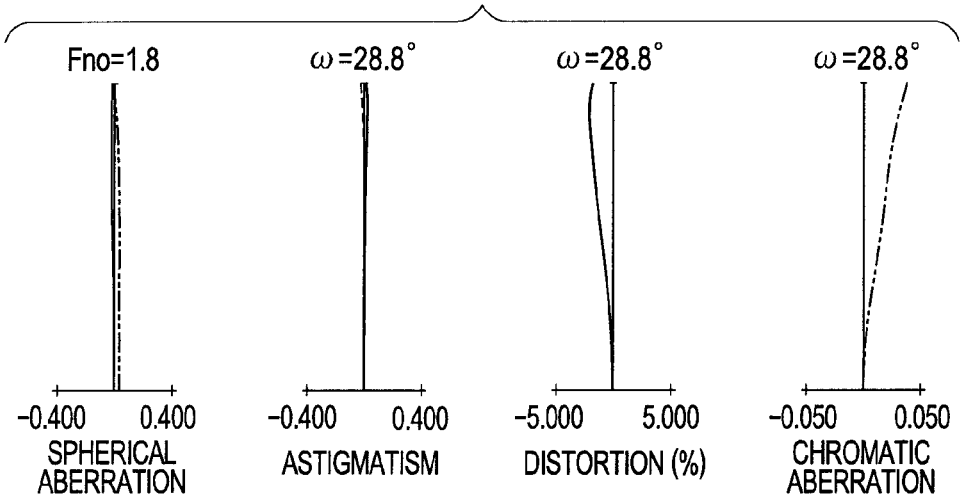
Figure 10B:
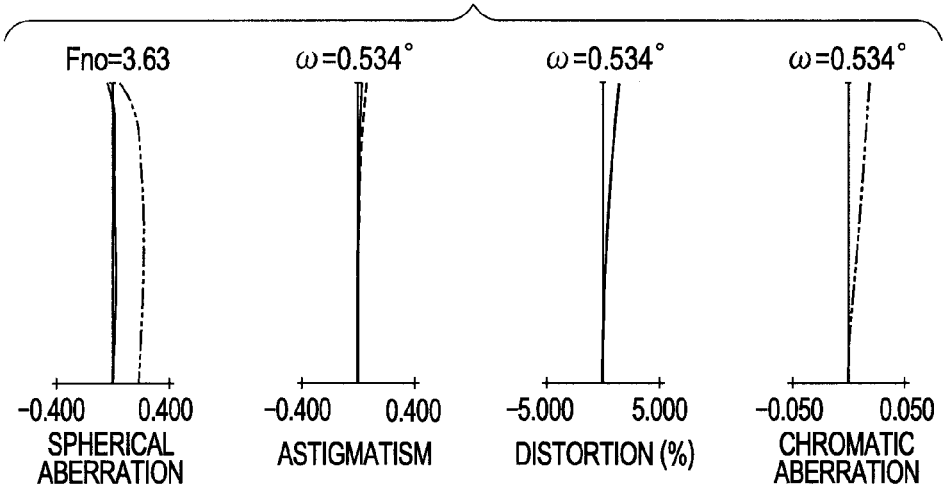
FIG. 10Ba is an aberration diagram at the telephoto end when focusing at an object distance of 12.0 m according to Embodiment 4 of the present invention.
Figure 10B:
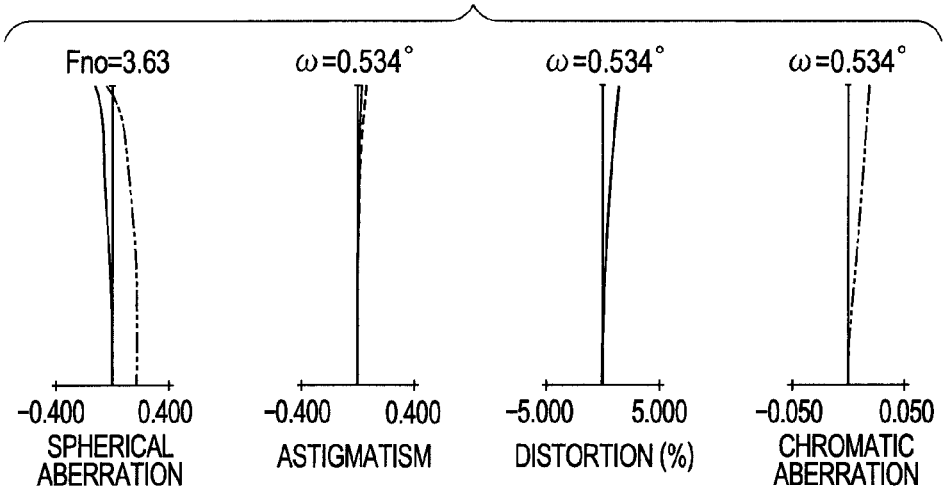
Figure 10B:
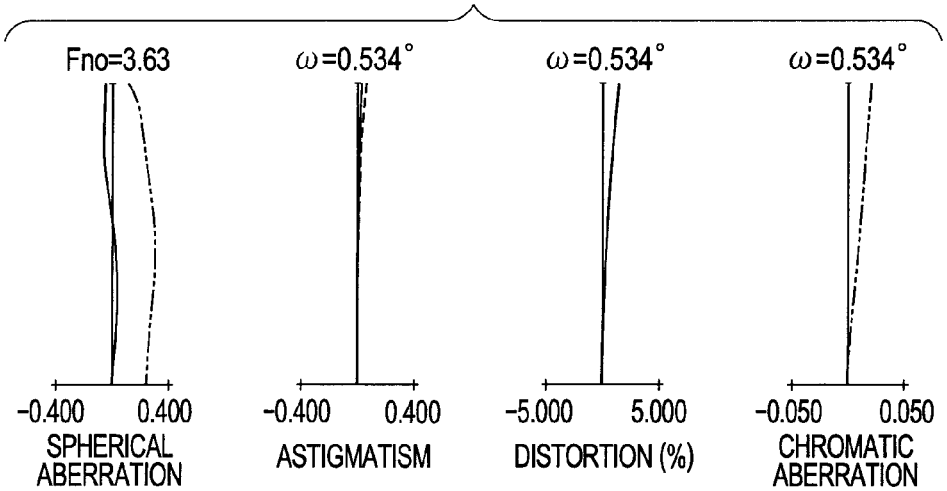

FIGS. 10Aa, 10Ab, and 10Ac are aberration diagrams of Numerical Embodiment 4 at a wide-angle end at object distances of 12.0 m, infinity, and close range (3.5 m), respectively. FIGS. 10Ba, 10Bb, and 10Bc are aberration diagrams of Numerical Embodiment 4 at a telephoto end at object distances of 12.0 m, infinity, and close range (3.5 m), respectively. Here, the object distance is a value with reference to the image plane.

Numerical values corresponding to the respective expressions of this embodiment are shown in Table 1. In addition, values obtained when the breathing of this embodiment is defined as a ratio of a length variation of a focal length of the entire system at a wide-angle end at close range to a focal length of the entire system at a wide-angle end at the object distance of infinity are shown in Table 2.

This embodiment satisfies the expressions (1) to (5) and achieves a zoom lens having a high magnification, a small size and light weight, little aberration deviation due to focus adjustment, and little breathing.

Numerical Embodiment 4

Unit: mm

Surface data

| Surface Number | r | d | nd | vd | Effective diameter |
|---|---|---|---|---|---|
| 1 | −2350.524 | 17.00 | 1.60311 | 60.6 | 227.97 |
| 2 | −460.033 | 10.29 | | | 224.48 |
| 3 | −1487.959 | 4.50 | 1.69680 | 55.5 | 189.59 |
| 4 | 232.002 | 0.18 | | | 173.66 |
| 5 | 186.833 | 16.00 | 1.80809 | 22.8 | 171.86 |
| 6 | 373.507 | 24.72 | | | 168.63 |
| 7 | −251.578 | 4.48 | 1.77250 | 49.6 | 168.08 |
| 8 | 675.623 | 1.54 | | | 165.66 |
| 9 | 329.716 | 34.00 | 1.60311 | 60.6 | 171.44 |
| 10* | −239.056 | 0.28 | | | 172.99 |
| 11 | 335.084 | 4.34 | 1.84666 | 23.8 | 170.95 |
| 12 | 161.470 | 3.33 | | | 166.34 |
| 13 | 180.933 | 29.00 | 1.43387 | 95.1 | 166.67 |
| 14 | −1007.581 | 11.00 | | | 166.83 |
| 15 | 244.710 | 19.00 | 1.43387 | 95.1 | 165.95 |
| 16 | −4667.505 | 0.28 | | | 165.06 |
| 17 | 142.602 | 19.00 | 1.49700 | 81.5 | 156.35 |
| 18 | 370.276 | (Variable) | | | 153.91 |
| 19 | 125.846 | 2.00 | 1.83481 | 42.7 | 44.34 |
| 20 | 50.861 | 7.45 | | | 40.10 |
| 21 | −111.873 | 1.90 | 1.81600 | 46.6 | 38.12 |
| 22 | 81.295 | 5.50 | | | 37.22 |
| 23 | −65.760 | 1.90 | 1.81600 | 46.6 | 37.42 |
| 24 | 87.235 | 8.32 | 1.92286 | 21.3 | 40.52 |
| 25 | −79.376 | 0.67 | | | 41.73 |
| 26 | −89.729 | 2.20 | 1.88300 | 40.8 | 41.96 |
| 27 | −408.148 | (Variable) | | | 43.41 |
| 28 | −453.539 | 10.50 | 1.59240 | 68.3 | 61.17 |
| 29 | −84.689 | 0.20 | | | 63.37 |
| 30 | 310.071 | 9.00 | 1.48749 | 70.2 | 64.85 |
| 31 | −162.832 | 4.25 | | | 65.06 |
| 32 | −80.000 | 2.50 | 1.72047 | 34.7 | 64.99 |
| 33 | −120.000 | 0.20 | | | 66.39 |
| 34 | 110.608 | 2.50 | 1.84666 | 23.9 | 67.42 |
| 35 | 71.952 | 10.00 | 1.49700 | 81.5 | 66.16 |
| 36 | 29725.425 | 0.20 | | | 66.05 |
| 37 | 177.665 | 9.00 | 1.48749 | 70.2 | 65.79 |
| 38 | −149.331 | (Variable) | | | 65.38 |
| 39 (Stop) | ∞ | 4.50 | | | 35.95 |
| 40 | −73.418 | 1.80 | 1.81600 | 46.6 | 34.56 |
| 41 | 76.284 | 0.20 | | | 34.14 |
| 42 | 37.966 | 5.70 | 1.80809 | 22.8 | 34.75 |
| 43 | 109.139 | 4.97 | | | 33.84 |
| 44 | −66.390 | 2.00 | 1.88300 | 40.8 | 33.34 |
| 45 | −530.397 | 30.00 | 1.80518 | 25.4 | 33.63 |
| 46 | −143.721 | 5.50 | | | 35.83 |
| 47 | −208.261 | 5.00 | 1.62041 | 60.3 | 35.44 |
| 48 | −72.261 | 0.20 | | | 35.52 |
| 49 | −1120.488 | 1.50 | 1.83400 | 37.2 | 34.87 |
| 50 | 42.660 | 10.00 | 1.62041 | 60.3 | 34.15 |
| 51 | −53.539 | 0.20 | | | 33.99 |
| 52 | 75.978 | 7.00 | 1.48749 | 70.2 | 31.56 |
| 53 | −35.421 | 1.50 | 1.83400 | 37.2 | 30.64 |
| 54 | −122.470 | 5.00 | | | 29.88 |
| 55 | ∞ | 55.50 | 1.51633 | 64.2 | 40.00 |
| 56 | ∞ | | | | 40.00 |
| Image plane | ∞ | | | | |

-continued

Unit: mm

Aspherical surface data
Tenth surface

K = −1.32497e+000   A4 = 3.88103e−010   A6 = −1.90763e−014
A8 = 6.09570e−017   A10 = −8.18397e−021   A12 = 3.57731e−025

Various data
Zoom ratio 59.06

| | | | | | |
|---|---|---|---|---|---|
| Focal length | 10.00 | 24.81 | 66.23 | 325.00 | 590.61 |
| F-number | 1.80 | 1.80 | 1.80 | 2.00 | 3.63 |
| Angle of field | 28.81 | 12.50 | 4.75 | 0.97 | 0.53 |
| Image height | 5.50 | 5.50 | 5.50 | 5.50 | 5.50 |
| Total lens length | 673.01 | 673.01 | 673.01 | 673.01 | 673.01 |
| BF | 10.00 | 10.00 | 10.00 | 10.00 | 10.00 |
| d18 | 2.00 | 72.00 | 117.00 | 153.30 | 159.50 |
| d27 | 239.71 | 160.59 | 101.50 | 31.00 | 2.99 |
| d38 | 3.50 | 12.62 | 26.71 | 60.90 | 82.72 |
| Entrance pupil position | 189.06 | 373.78 | 722.18 | 2433.71 | 4900.33 |
| Exit pupil position | −257.05 | −257.05 | −257.05 | −257.05 | −257.05 |
| Front principal point position | 198.69 | 396.28 | 771.98 | 2363.17 | 4184.71 |
| Rear principal point position | −0.00 | −14.81 | −56.23 | −315.00 | −580.61 |

Zoom lens unit data

| Unit | First surface | Focal length | Lens structure length | Front principal point position | Rear principal point position |
|---|---|---|---|---|---|
| 1 | 1 | 221.00 | 198.94 | 130.55 | −11.70 |
| 2 | 19 | −27.50 | 29.93 | 7.36 | −14.59 |
| 3 | 28 | 67.50 | 48.35 | 18.07 | −16.77 |
| 4 | 39 | 87.80 | 140.57 | 66.05 | 9.57 |

Embodiment 5

Figure 11A:
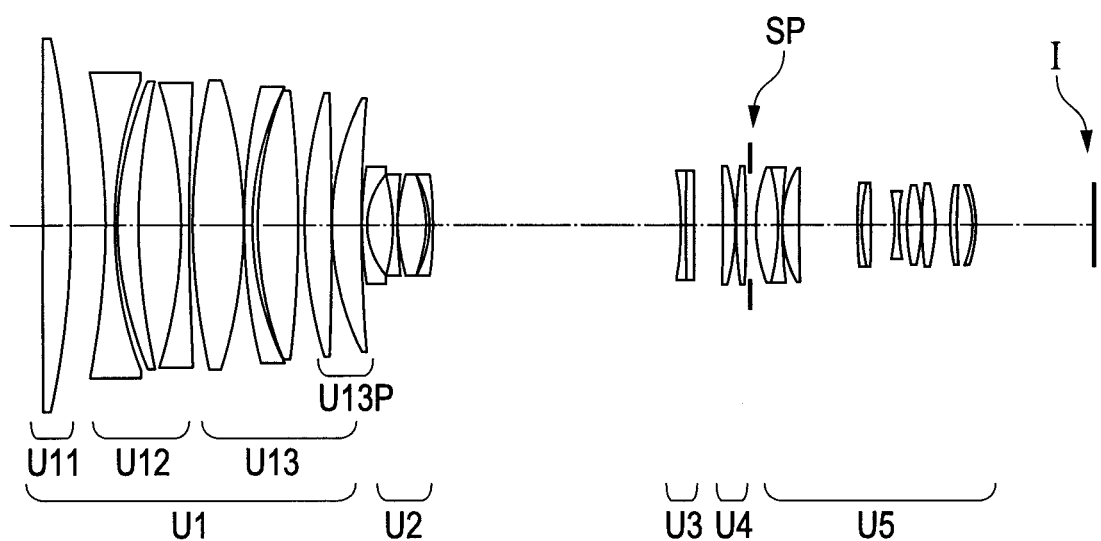
FIG. 11A is a lens cross sectional view at the wide-angle end when focusing at infinity according to Embodiment 5 of the present invention.
Figure 11B:
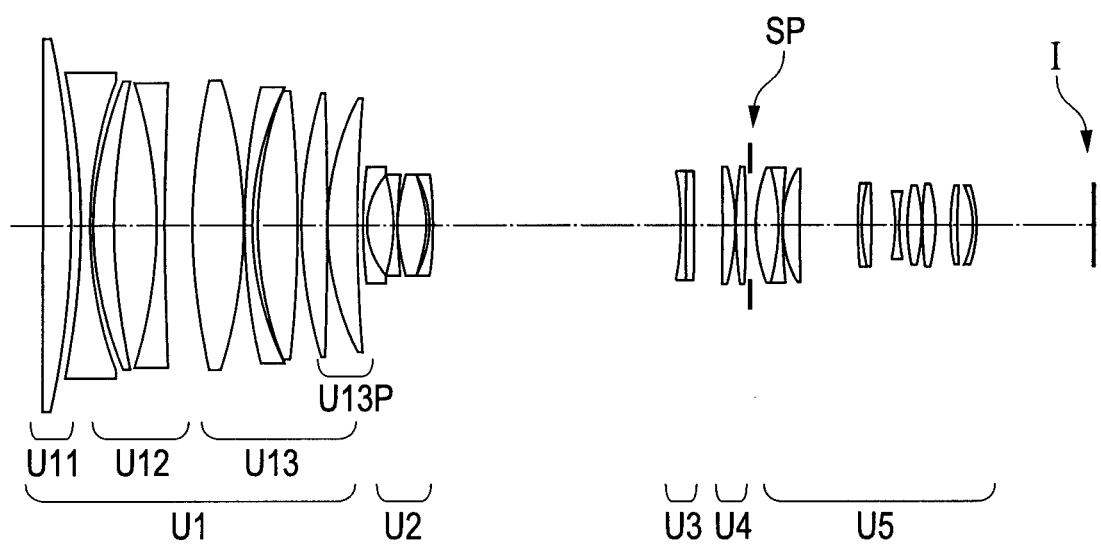
FIG. 11B is a lens cross sectional view at the wide-angle end when focusing at close range according to Embodiment 5 of the present invention.

FIGS. 11A and 11B are lens cross sectional views of a zoom lens according to Embodiment 5 (Numerical. Embodiment 5) of the present invention at a wide-angle end in which the object distance is infinity and close range, respectively.

In FIGS. 11A and 11B, the zoom lens of this embodiment includes, in order from the object side, a focus lens unit having positive refractive power as the first lens unit U1, a first variator having negative refractive power for varying magnification as a second lens unit U2, a compensator having positive refractive power as a fourth lens unit U4, a stop SP, an imaging lens unit having positive refractive power and an image forming action as a five lens unit U5, and an image pickup surface I. In this embodiment, the second lens unit U2, the third lens unit U3, and the fourth lens unit U4 constitute the magnification-varying lens unit. The second lens unit U2 (first variator) varies magnification from the wide-angle end to the telephoto end by moving monotonously on the optical axis toward the image plane side. The third lens unit U3 (second variator) moves on the optical axis so as to vary magnification from the wide-angle end to the telephoto end. The fourth lens unit U4 (compensator) moves non-linearly on the optical axis in order to correct image plane variation accompanying magnification-varying. Note that, the third lens unit U3 may be the compensator and the fourth lens unit U4 may be the second variator.

A structure of the first lens unit U1 in this embodiment corresponds to first to seventeenth surfaces. The first lens unit U1 includes the first sub-lens unit U11 having positive refractive power, the second sub-lens unit U12 having negative refractive power that moves 9.18 mm toward the object side from the object distance of infinity to close range, and the third sub-lens unit U13 having positive refractive power. Further, a lens unit U13$p$, which is included in the third sub-lens unit U13 and has positive refractive power, moves 1.38 mm toward the object side from the object distance of infinity to close range. Therefore, in this embodiment, the lens unit U13$p$ corresponds to the sub-third sub-lens unit U13$f$.

Figure 12A:
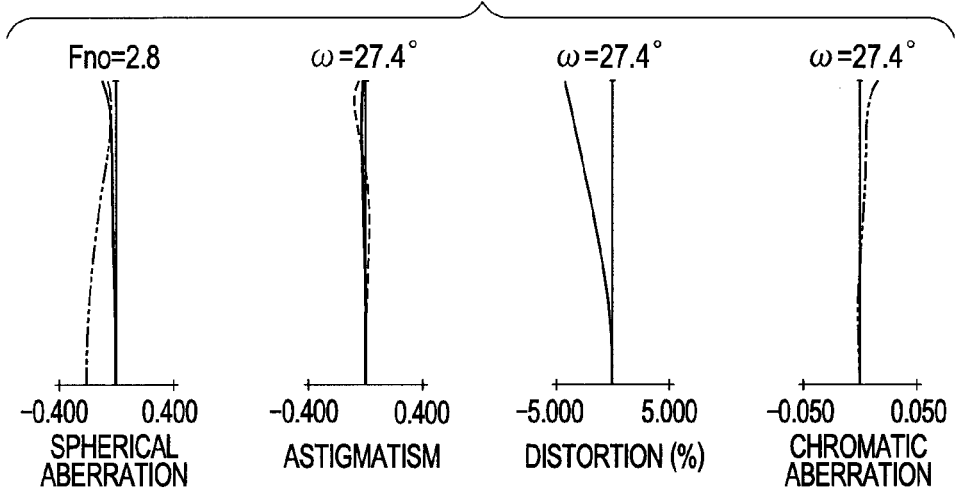
FIG. 12Aa is an aberration diagram at the wide-angle end when focusing at an object distance of 7.0 m according to Embodiment 5 of the present invention.
Figure 12A:
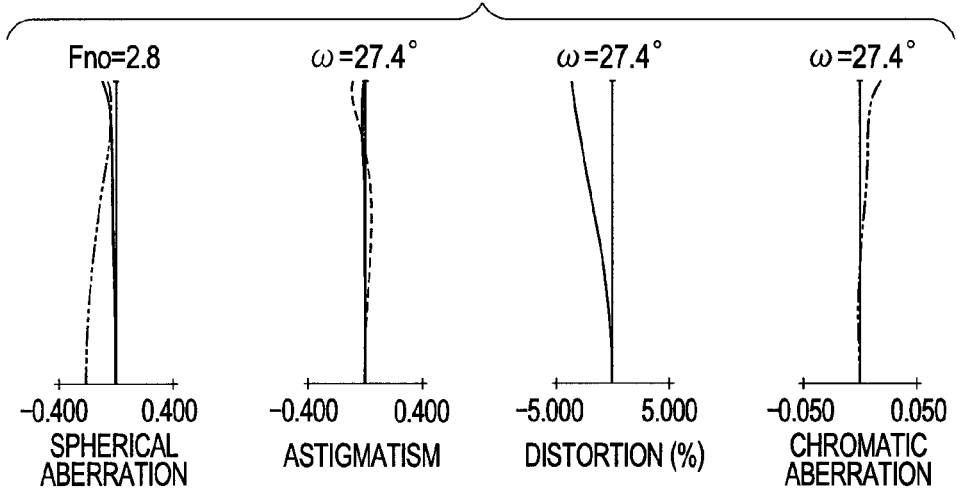
Figure 12A:
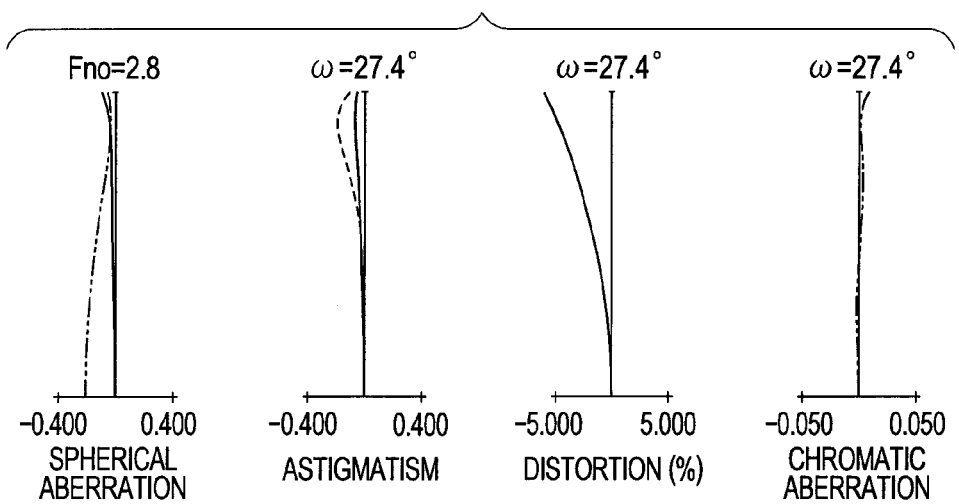
Figure 12B:
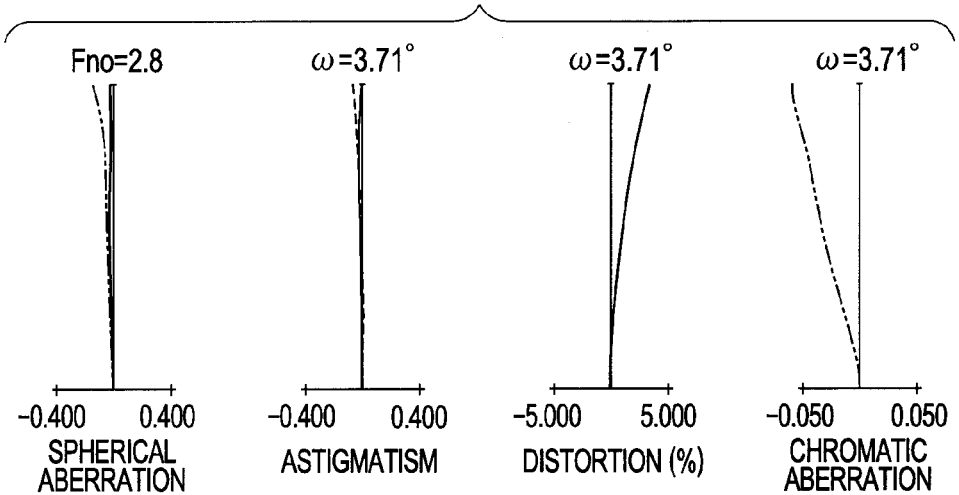
FIG. 12Ba is an aberration diagram at the telephoto end when focusing at an object distance of 7.0 m according to Embodiment 5 of the present invention.
Figure 12B:
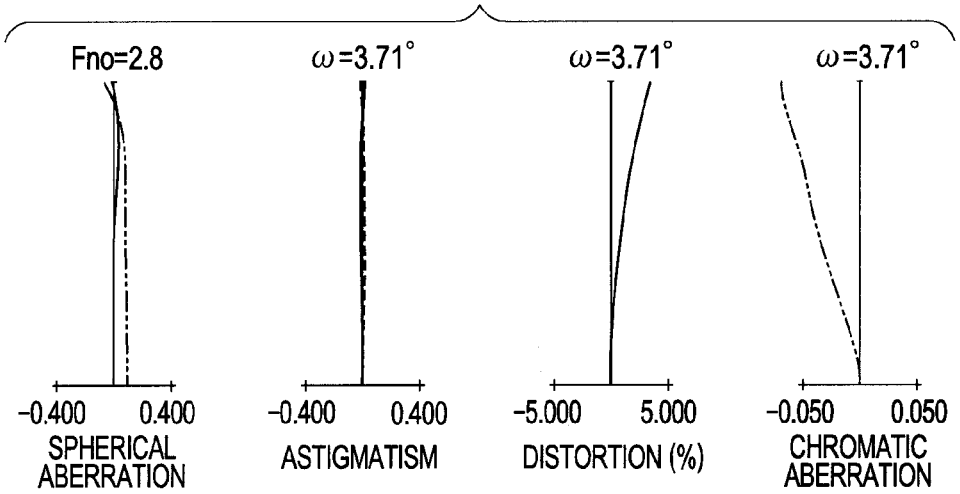
Figure 12B:
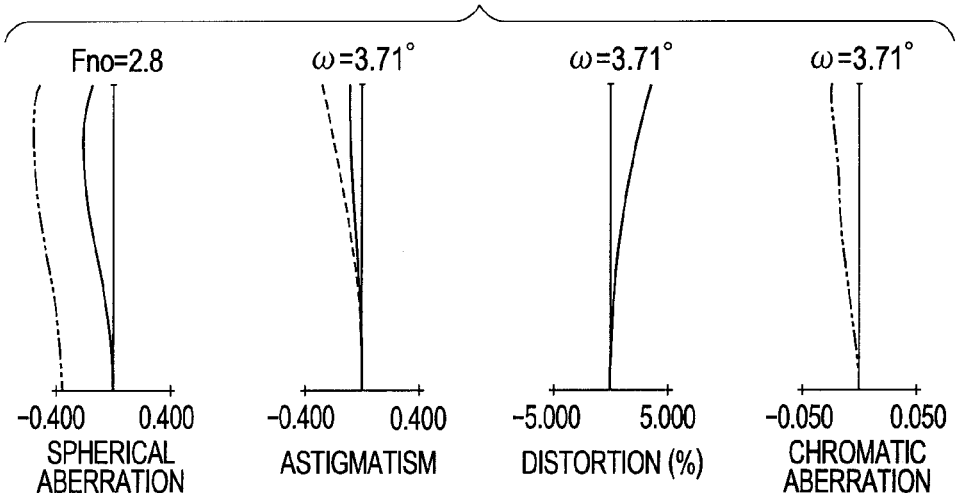

FIGS. 12Aa, 12Ab, and 12Ac are aberration diagrams of Numerical Embodiment 5 at a wide-angle end at object distances of 7.0 m, infinity, and close range (1.8 m), respectively. FIGS. 12Ba, 12Bb, 12Bc are aberration diagrams of Numerical Embodiment 5 at a telephoto end at object distances of 7.0 m, infinity, and close range (1.8 m), respectively. Here, the object distance is a value with reference to the image plane.

Numerical values corresponding to the respective expressions of this embodiment are shown in Table 1. In addition, values obtained when the breathing of this embodiment is defined as a ratio of a length variation of a focal length of the entire system at a wide-angle end at close range to a focal length of the entire system at a wide-angle end at the object distance of infinity are shown in Table 2. This embodiment satisfies the expressions (1) to (5) and achieves a zoom lens having a high magnification, a small size and light weight, little aberration deviation due to focus adjustment, and little breathing.

Numerical Embodiment 5

Unit: mm
Surface data

| Surface Number | r | d | nd | vd | Effective diameter |
|---|---|---|---|---|---|
| 1 | −6789.500 | 10.50 | 1.60311 | 60.6 | 134.64 |
| 2 | −316.819 | 13.29 | | | 132.30 |
| 3 | −273.538 | 3.30 | 1.69680 | 55.5 | 111.09 |
| 4 | 148.689 | 1.08 | | | 104.53 |
| 5 | 130.544 | 8.05 | 1.80809 | 22.8 | 104.31 |
| 6 | 237.359 | 15.90 | | | 103.09 |
| 7 | −175.038 | 3.20 | 1.77250 | 49.6 | 101.98 |
| 8 | 940.865 | 1.10 | | | 102.92 |
| 9 | 219.161 | 19.57 | 1.60311 | 60.6 | 104.90 |
| 10* | −164.924 | 0.20 | | | 104.95 |
| 11 | 209.351 | 3.10 | 1.84666 | 23.8 | 99.71 |
| 12 | 112.342 | 2.14 | | | 96.37 |
| 13 | 133.373 | 15.29 | 1.43387 | 95.1 | 96.41 |
| 14 | −421.039 | 2.50 | | | 95.94 |
| 15 | 161.872 | 10.10 | 1.43387 | 95.1 | 94.94 |
| 16 | −1920.492 | 0.20 | | | 94.53 |
| 17 | 101.420 | 11.24 | 1.49700 | 81.5 | 91.37 |
| 18 | 513.546 | (Variable) | | | 90.18 |
| 19* | 225.182 | 1.50 | 1.77250 | 49.6 | 42.22 |
| 20 | 29.043 | 10.32 | | | 36.09 |
| 21 | −44.737 | 1.20 | 1.61800 | 63.3 | 35.95 |
| 22 | 164.036 | 0.15 | | | 36.27 |
| 23 | 65.711 | 10.74 | 1.72047 | 34.7 | 36.66 |
| 24 | −44.484 | 0.96 | | | 36.17 |
| 25 | −36.749 | 1.20 | 1.61800 | 63.3 | 36.10 |
| 26 | −183.639 | (Variable) | | | 35.74 |
| 27 | −89.025 | 1.50 | 1.75500 | 52.3 | 37.60 |
| 28 | 369.683 | 3.50 | 1.92286 | 18.9 | 38.78 |
| 29 | −603.636 | (Variable) | | | 39.47 |
| 30 | −604.961 | 4.86 | 1.61800 | 63.3 | 41.71 |
| 31 | −70.764 | 0.20 | | | 42.31 |
| 32 | 185.252 | 3.69 | 1.60311 | 60.6 | 42.80 |
| 33 | −508.303 | (Variable) | | | 42.75 |
| 34 (Stop) | ∞ | 2.00 | | | 41.98 |
| 35 | 56.310 | 8.59 | 1.48749 | 70.2 | 41.46 |
| 36 | −83.084 | 1.50 | 2.00069 | 25.5 | 40.81 |
| 37 | 131.700 | 0.20 | | | 40.28 |
| 38 | 42.831 | 6.67 | 1.58913 | 61.1 | 40.75 |

-continued

Unit: mm

| | | | | | |
|---|---|---|---|---|---|
| 39 | 657.022 | 22.84 | | | 40.17 |
| 40 | 611.381 | 1.00 | 1.88300 | 40.8 | 29.41 |
| 41 | 58.046 | 3.85 | 1.92286 | 18.9 | 28.70 |
| 42 | −404.813 | 9.41 | | | 28.21 |
| 43 | −44.692 | 1.00 | 1.88300 | 40.8 | 23.15 |
| 44 | 47.466 | 3.30 | | | 23.79 |
| 45 | 58.023 | 5.64 | 1.51633 | 64.1 | 27.01 |
| 46 | −52.816 | 0.15 | | | 27.86 |
| 47 | 130.273 | 5.42 | 1.48749 | 70.2 | 28.73 |
| 48 | −50.737 | 5.41 | | | 29.06 |
| 49 | 68.955 | 2.41 | 1.48749 | 70.2 | 28.19 |
| 50 | 111.123 | 6.08 | | | 27.83 |
| 51 | −34.252 | 1.30 | 1.80518 | 25.4 | 27.41 |
| 52 | −50.630 | | | | 28.05 |
| Image plane | ∞ | | | | |

Aspherical surface data

Tenth surface

K = −1.83956e+000  A4 = −1.10900e−009  A6 = 1.13486e−012
A8 = 4.72225e−016  A10 = −1.63366e−019  A12 = 1.77698e−023

Nineteenth surface

K = 7.90027e+001  A4 = 1.53253e−007  A6 = −1.38868e−009
A8 = 1.52527e−012  A10 = −2.14292e−015  A12 = −1.78341e−018

Various data
Zoom ratio 8.00

| | | | | | |
|---|---|---|---|---|---|
| Focal length | 30.00 | 61.17 | 89.34 | 121.04 | 240.01 |
| F-number | 2.80 | 2.80 | 2.80 | 2.80 | 2.80 |
| Angle of field | 27.40 | 14.26 | 9.87 | 7.32 | 3.71 |
| Image height | 15.55 | 15.55 | 15.55 | 15.55 | 15.55 |
| Total lens length | 400.53 | 400.53 | 400.53 | 400.53 | 400.53 |
| BF | 45.51 | 45.51 | 45.51 | 45.51 | 45.51 |
| d18 | 0.70 | 41.31 | 56.70 | 67.36 | 86.02 |
| d26 | 94.10 | 37.62 | 15.33 | 4.60 | 16.13 |
| d29 | 11.12 | 23.76 | 28.03 | 27.43 | 3.76 |
| d33 | 1.80 | 5.02 | 7.65 | 8.32 | 1.79 |
| Entrance pupil position | 121.66 | 214.82 | 280.55 | 348.43 | 591.43 |
| Exit pupil position | −78.95 | −78.95 | −78.95 | −78.95 | −78.95 |
| Front principal point position | 144.43 | 245.93 | 305.76 | 351.75 | 368.60 |
| Rear principal point position | 15.51 | −15.66 | −43.83 | −75.53 | −194.50 |

Zoom lens unit data

| Unit | First surface | Focal length | Lens structure length | Front principal point position | Rear principal point position |
|---|---|---|---|---|---|
| 1 | 1 | 131.30 | 120.74 | 87.74 | 4.22 |
| 2 | 19 | −37.06 | 26.07 | 1.59 | −18.43 |
| 3 | 27 | −154.83 | 5.00 | −0.70 | −3.38 |
| 4 | 30 | 81.94 | 8.74 | 3.53 | −1.95 |
| 5 | 34 | 150.79 | 86.76 | 8.03 | −70.47 |

TABLE 1

Table 1: Numerical values corresponding to the respective expressions in Numerical Embodiments 1 to 5

| | Numerical Embodiment | | | | |
|---|---|---|---|---|---|
| Expression | 1 | 2 | 3 | 4 | 5 |
| (1) f12/f13f | −1.269 | −1.609 | −0.718 | −0.719 | −0.671 |
| (2) δx13f/δx12 | 0.30 | 0.20 | 0.40 | 2.00 | 0.15 |
| (3) f1/f11 | 0.212 | 0.126 | 0.238 | 0.235 | 0.239 |
| (4) f1/ft | 0.626 | 0.505 | 0.592 | 0.374 | 0.547 |
| (5) fw/IS | 0.965 | 0.965 | 0.965 | 0.909 | 0.965 |

TABLE 2

Table 2: Breathing in Numerical Embodiments 1 to 5

| | | Numerical Embodiment | | | | |
|---|---|---|---|---|---|---|
| | | 1 | 2 | 3 | 4 | 5 |
| Focal length of entire system (at wide-angle end) | inf | 30.00 | 30.00 | 30.00 | 10.00 | 30.00 |
| | mod | 29.40 | 29.02 | 29.58 | 10.38 | 28.91 |
| Variation ratio (inf/mod)/inf (%) | | 1.99 | 3.27 | 1.41 | −3.85 | 3.64 |

Embodiment 6

Figure 13:
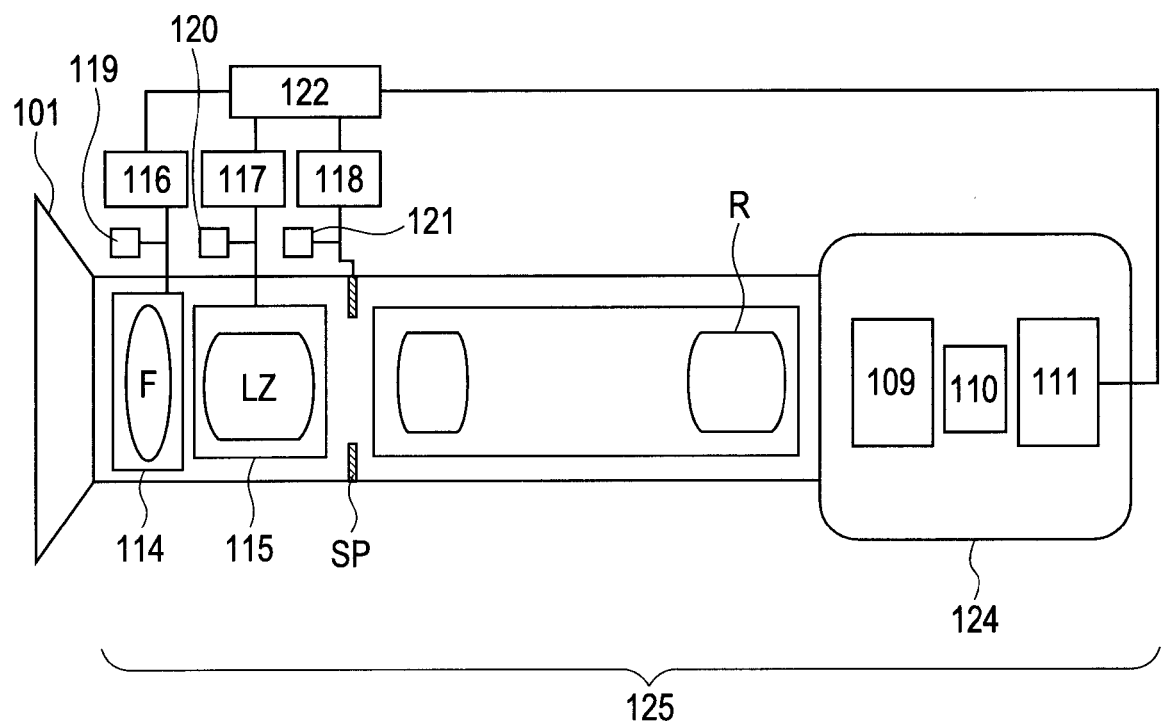
FIG. 13 is a schematic diagram of an image pickup apparatus according to Embodiment 6 of the present invention.

FIG. 13 is a schematic diagram of an image pickup apparatus according to Embodiment 6 of the present invention using any one of the zoom lens of Embodiments 1 to 5 as an image pickup optical system.

In FIG. 13, an image pickup apparatus 125 includes a zoom lens 101 of any one of Embodiments 1 to 5 and a camera 124 that can be attached to and removed from the zoom lens 101. The zoom lens 101 includes a first lens unit F including a lens unit for focus adjustment, a magnification-varying lens unit LZ, and a lens unit R for imaging. The zoom lens 101 further includes an aperture stop SP. The first lens unit F and the magnification-varying lens unit LZ are driven in an optical axis direction respectively by drive mechanisms 114 and 115 such as a helicoid or a cam. The drive mechanisms 114 and 115 and the aperture stop SP are electrically driven by motors (drive units) 116 to 118 that are electrically driven, respectively. Positions of the first lens unit F and the magnification-varying lens unit LZ on the optical axis and a stop diameter of the aperture stop SP are detected by detectors 119 to 121, respectively, such as an encoder, a potentiometer, or a photo sensor. The camera 124 includes a glass block 109 corresponding to an optical filter or a color separation optical system, and a solid-state image pickup element (photoelectric transducer) 110 such as a CCD sensor or a CMOS sensor for receiving light of a subject image formed by the zoom lens 101. In addition, CPUs 111 and 122 control various drives of the camera 124 and the zoom lens 101, respectively. In this way, through use of the zoom lens of the present invention for a television camera, an image pickup apparatus having high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-069565, filed Mar. 28, 2011, which is hereby incorporated by reference herein in its entirety.

What is claimed is:

1. A zoom lens, comprising, in order from an object side:
a first lens unit having positive refractive power which does not move for varying magnification;
a magnification-varying lens unit including at least two lens units which move for varying magnification;
an aperture stop; and
an imaging lens unit having positive refractive power which does not move for varying magnification, wherein:
the first lens unit includes, in order from the object side, a first sub-lens unit having positive refractive power, a second sub-lens unit having negative refractive power, and a third sub-lens unit having positive refractive power;

the third sub-lens unit includes a movable sub-third sub-lens unit having positive refractive power;

the second sub-lens unit and the sub-third sub-lens unit are respectively driven to the object side so as to perform focus adjustment to an object at a short distance; and the following expressions are satisfied:

$$-2.5 < f12/f13f < -0.4; \text{ and}$$

$$0.05 < \delta x13f/\delta x12 < 5.0,$$

where f12 represents a focal length of the second sub-lens unit, f13f represents a focal length of the sub-third sub-lens unit, δ×12 represents a drive amount of the second sub-lens unit in focus adjustment, and δ×13f represents a drive amount of the sub-third sub-lens unit in focus adjustment.

2. A zoom lens according to claim 1, wherein the following expression is satisfied:

$$0.07 < f1/f11 < 0.35,$$

where f1 represents a focal length of the first lens unit, and f11 represents a focal length of the first sub-lens unit.

3. A zoom lens according to claim 1, wherein the following expression is satisfied:

$$0.2 < f1/ft < 1.0,$$

where ft represents a focal length of an entire system of the zoom lens at a telephoto end.

4. An image pickup apparatus, comprising:
a zoom lens comprising, in order from an object side:
a first lens unit having positive refractive power which does not move for varying magnification;
a magnification-varying lens unit including at least two lens units which move for varying magnification;
an aperture stop; and
an imaging lens unit having positive refractive power which does not move for varying magnification, wherein:
the first lens unit includes, in order from the object side, a first sub-lens unit having positive refractive power, a second sub-lens unit having negative refractive power, and a third sub-lens unit having positive refractive power;
the third sub-lens unit includes a movable sub-third sub-lens unit having positive refractive power;
the second sub-lens unit and the sub-third sub-lens unit are respectively driven to the object side so as to perform focus adjustment to an object at a short distance; and
the following expressions are satisfied:

$$-2.5 < f12/f13f < -0.4; \text{ and}$$

$$0.05 < \delta x13f/\delta x12 < 5.0,$$

where f12 represents a focal length of the second sub-lens unit, f13f represents a focal length of the sub-third sub-lens unit, δ×12 represents a drive amount of the second sub-lens unit in focus adjustment, and δ×13f represents a drive amount of the sub-third sub-lens unit in focus adjustment; and an image pickup element that performs photoelectric conversion of an image formed by the zoom lens.

5. An image pickup apparatus according to claim 4, wherein the following expression is satisfied:

$$0.7 < fw/IS < 2.4,$$

where fw represents a focal length of an entire system of the zoom lens at a wide-angle end, and IS represents an image size.

* * * * *